(12) United States Patent
Watanabe et al.

(10) Patent No.: US 6,751,181 B1
(45) Date of Patent: Jun. 15, 2004

(54) RECORDING AND/OR REPRODUCING DEVICE FOR DISKS

(75) Inventors: Tomohiro Watanabe, Kanagawa (JP); Kazuyuki Takizawa, Chiba (JP); Takayuki Ishibashi, Chiba (JP); Yoshiteru Taka, Chiba (JP); Toru Hama, Kanagawa (JP)

(73) Assignee: Sony Corporation, Tokyo (JP)

( * ) Notice: Subject to any disclaimer, the term of this patent is extended or adjusted under 35 U.S.C. 154(b) by 211 days.

(21) Appl. No.: 09/831,912

(22) PCT Filed: Sep. 27, 2000

(86) PCT No.: PCT/JP00/06634
§ 371 (c)(1),
(2), (4) Date: May 25, 2001

(87) PCT Pub. No.: WO01/24175
PCT Pub. Date: Apr. 5, 2001

(30) Foreign Application Priority Data

| | | |
|---|---|---|
| Sep. 28, 1999 | (JP) | 11-273628 |
| Sep. 29, 1999 | (JP) | 11-276287 |
| Sep. 29, 1999 | (JP) | 11-276289 |
| Oct. 15, 1999 | (JP) | 11-293750 |

(51) Int. Cl.$^7$ .......................... G11B 17/22; G11B 17/04
(52) U.S. Cl. ................. 369/192; 369/30.81; 369/30.78; 369/30.85
(58) Field of Search ............ 369/30.77, 30.78, 369/30.81, 30.82, 30.85, 30.89, 192

(56) References Cited

U.S. PATENT DOCUMENTS

| | | | | |
|---|---|---|---|---|
| 5,561,657 A | * | 10/1996 | Ogawa ........................ 369/179 |
| 5,917,787 A | * | 6/1999 | Tsuchiya et al. ......... 369/30.81 |
| 5,982,720 A | * | 11/1999 | Takemasa et al. ....... 369/30.78 |
| 6,052,356 A | * | 4/2000 | Fujimoto et al. ......... 369/192 |
| 6,222,816 B1 | * | 4/2001 | Yoshida et al. ............. 369/247 |
| 6,337,843 B2 | * | 1/2002 | Yoshida et al. ......... 369/178.01 |
| 6,370,105 B1 | * | 4/2002 | Fujimoto ..................... 369/192 |
| 6,373,795 B2 | * | 4/2002 | Takemasa et al. ....... 369/30.85 |
| 6,466,524 B1 | * | 10/2002 | Fujimoto ................. 369/30.85 |
| 6,493,294 B1 | * | 12/2002 | Yoshida et al. .......... 369/30.81 |

FOREIGN PATENT DOCUMENTS

| | | |
|---|---|---|
| HU | 208 756 | 12/1993 |
| HU | 212 062 | 1/1996 |
| HU | 217 474 | 2/2000 |
| JP | 7-169170 | 7/1995 |
| JP | 2000-285565 | 10/2000 |

OTHER PUBLICATIONS

U.S. patent application Ser. No. 09/783,997, filed Feb. 16, 2001, pending.
U.S. patent application Ser. No. 09/831,885, filed May 22, 2001, pending.
U.S. patent application Ser. No. 09/831,884, filed May 22, 2001, pending.
U.S. patent application Ser. No. 09/856,493, filed Jun. 13, 2001, pending.
U.S. patent application Ser. No. 09/909,815, filed Jul. 23, 2001, pending.

* cited by examiner

*Primary Examiner*—William Klimowicz
(74) *Attorney, Agent, or Firm*—Oblon, Spivak, McClelland, Maier & Neustadt, P.C.

(57) ABSTRACT

A pair of pins 2c, 2d is arranged on the left and right of each of a plurality of trays 2 placed vertically movably so as to protrude laterally, whereas separating cams 82 are arranged on both sides of the trays 2 in a protrudable and withdrawable way. The separating cams 82 are formed with four first separating control parts 82c$_1$ for moving upward the pins 2c, 2d of the selected tray 2 and the tray(s) 2 thereabove, four second separating control parts 82c$_2$ for moving upward only the pins 2c, 2d of the tray(s) 2 above the selected tray 2, and four third separating control parts 82d each for engaging with only a pair of pins 2c, 2d of the selected tray 2. Movement of the separating cam 82 forms spaces above and below the selected tray 2 to hold a disc on the selected tray 2 from above and below for reproduction on the spot.

19 Claims, 37 Drawing Sheets

Fig.10
(a)
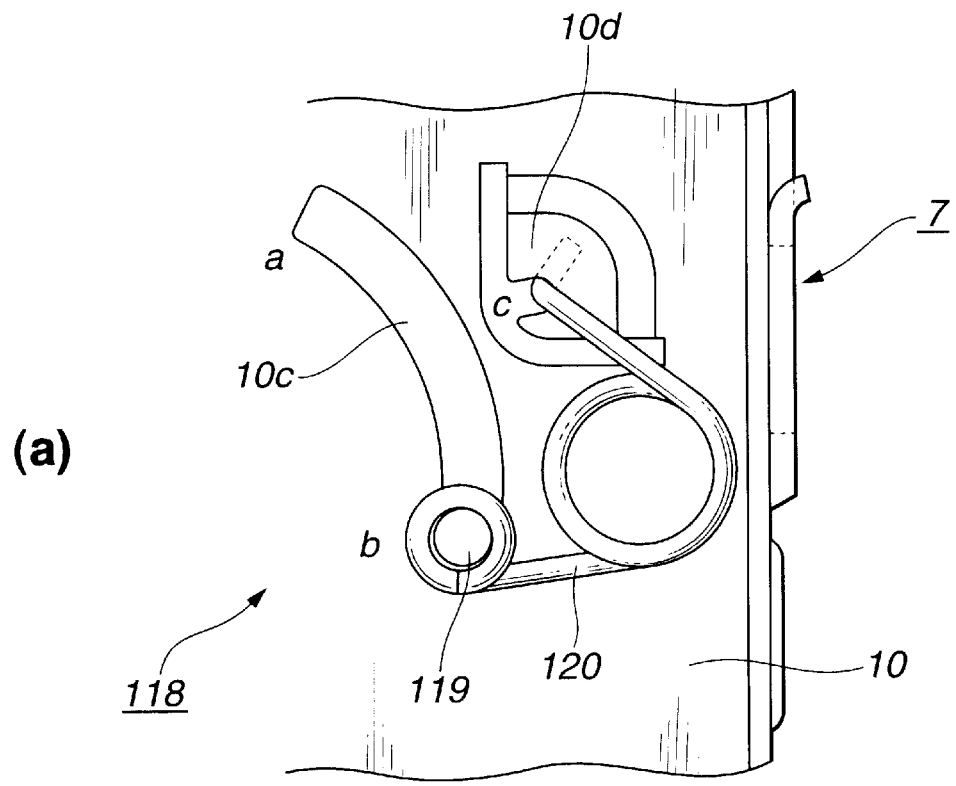
(b)
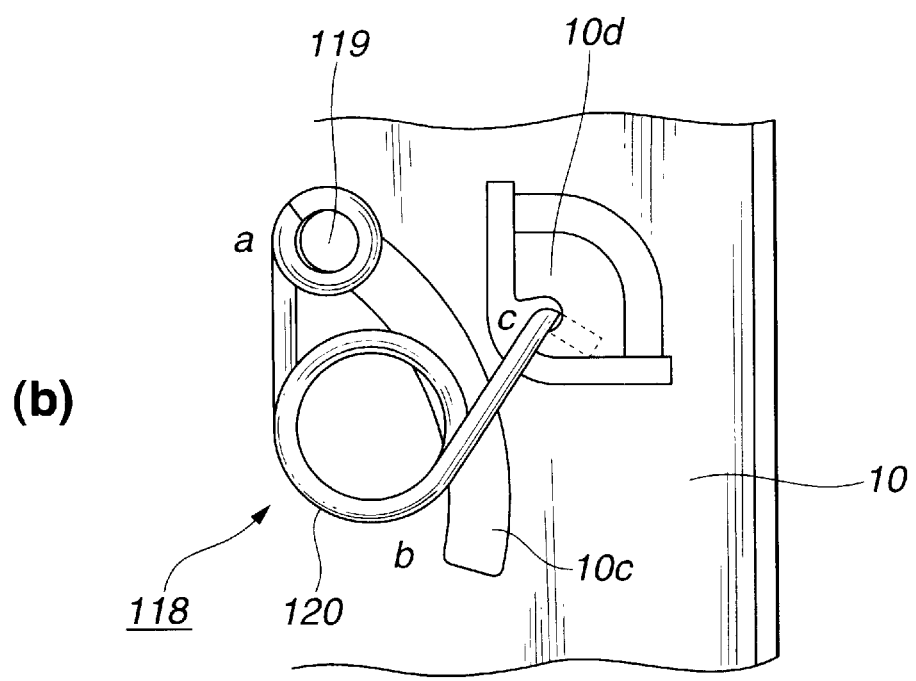

Fig.11
(a)
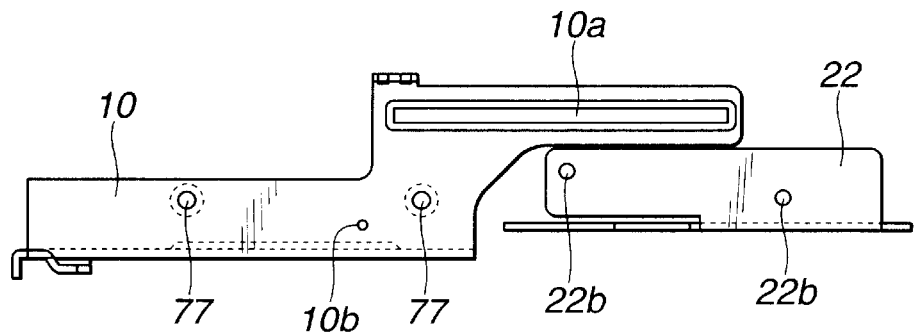
(b)
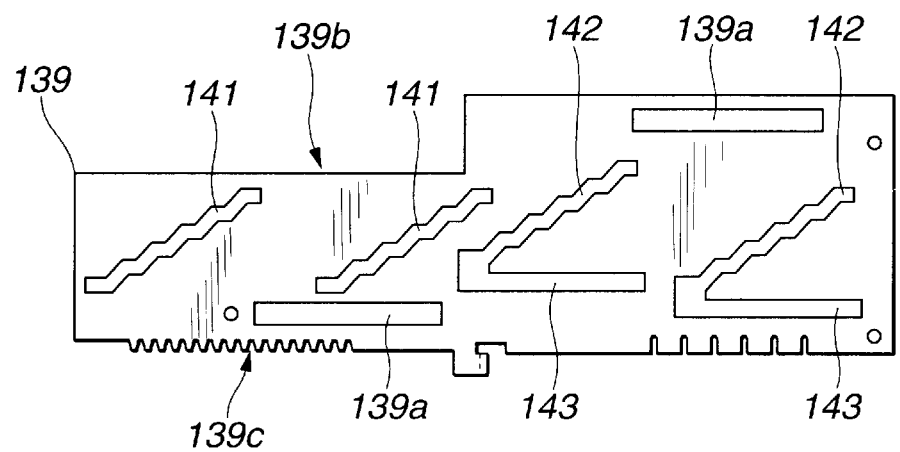
(c)
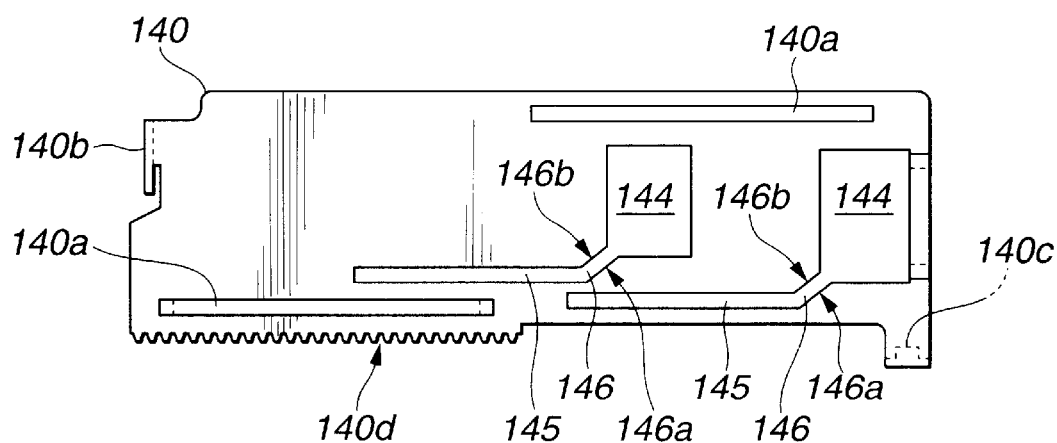

Fig.13
(a)
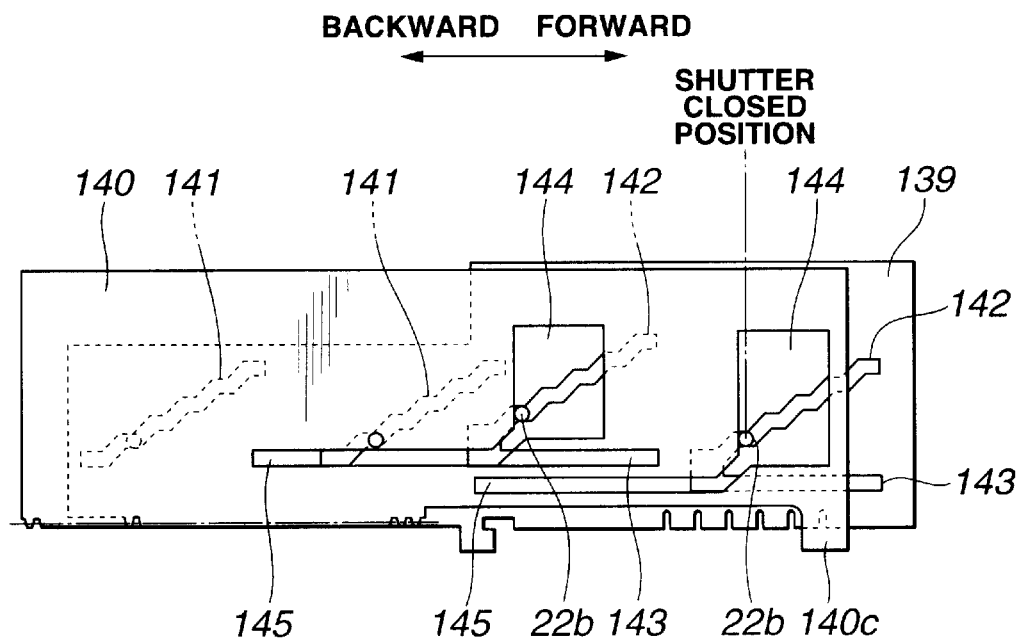
(b)
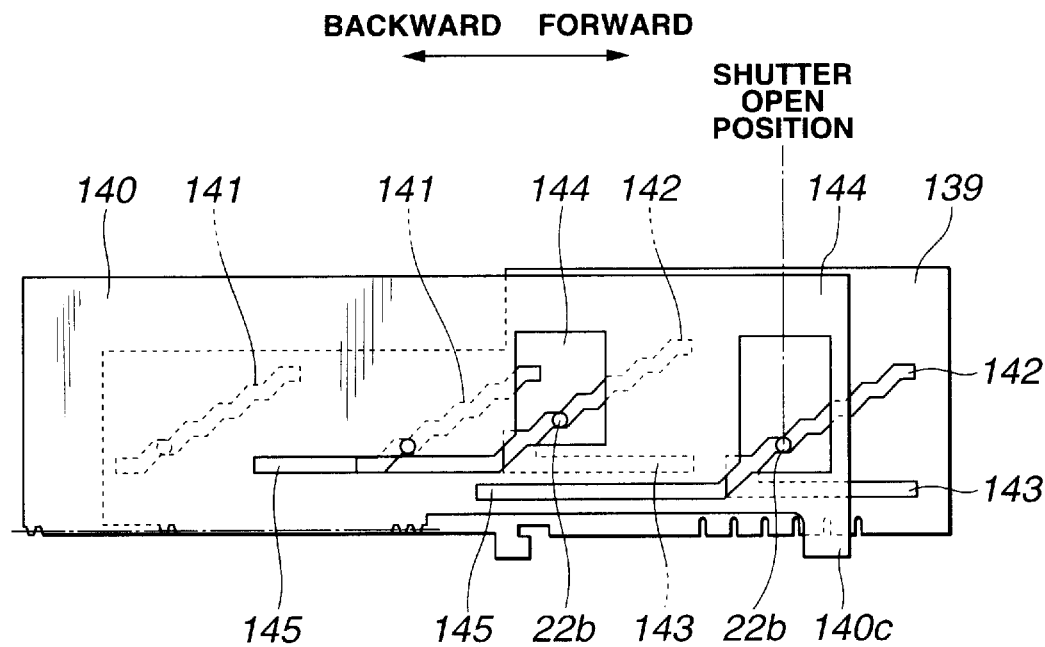

Fig.15
(a)
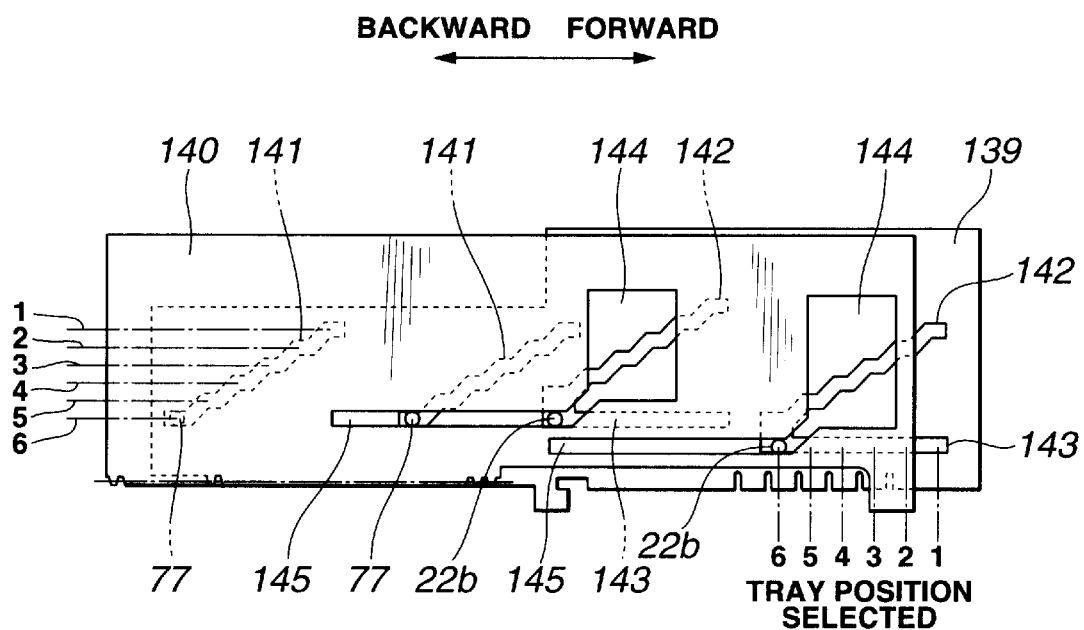
(b)
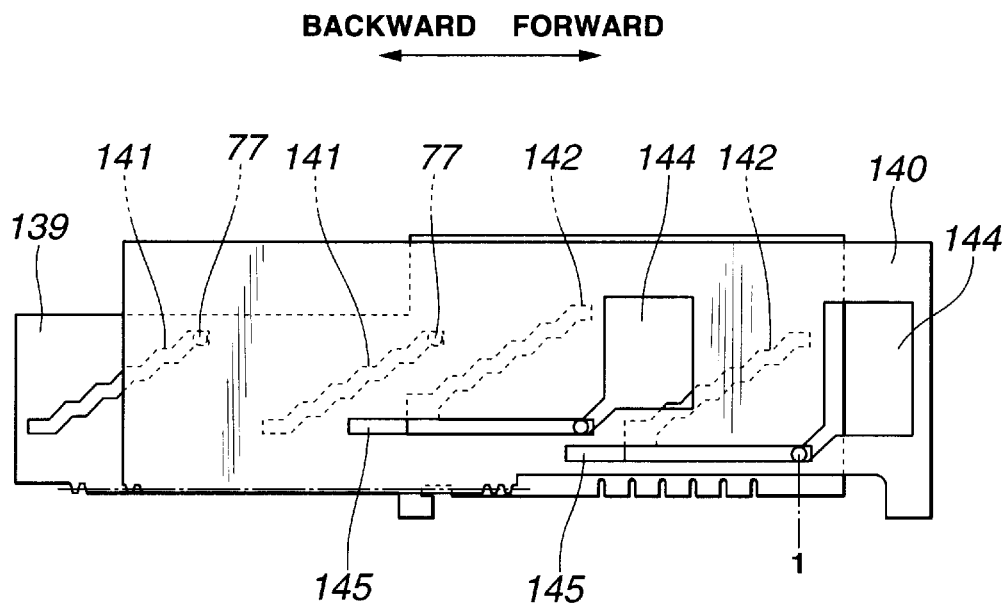

Fig.16
(a)
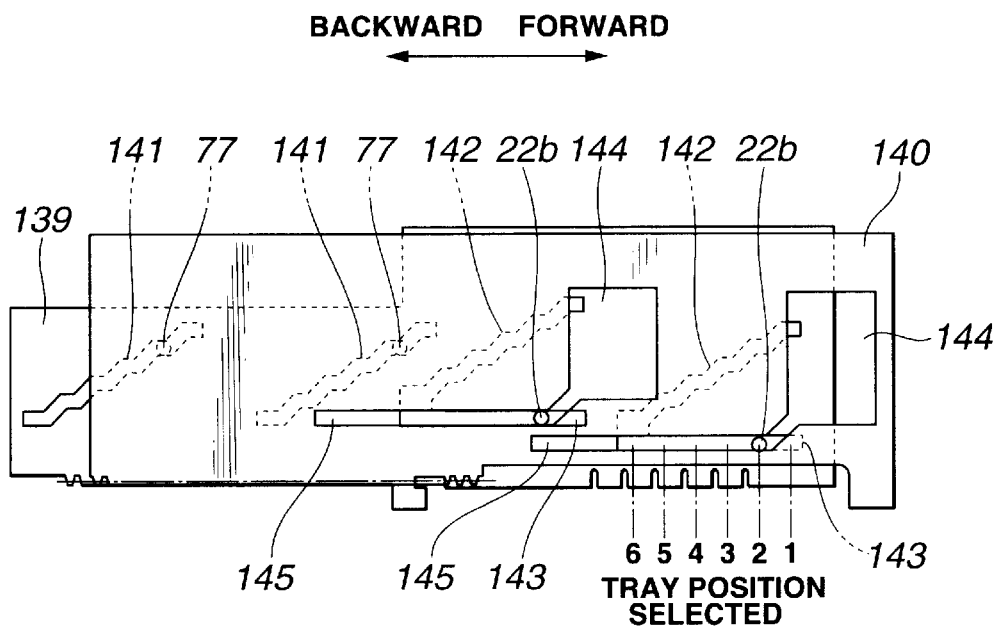
(b)
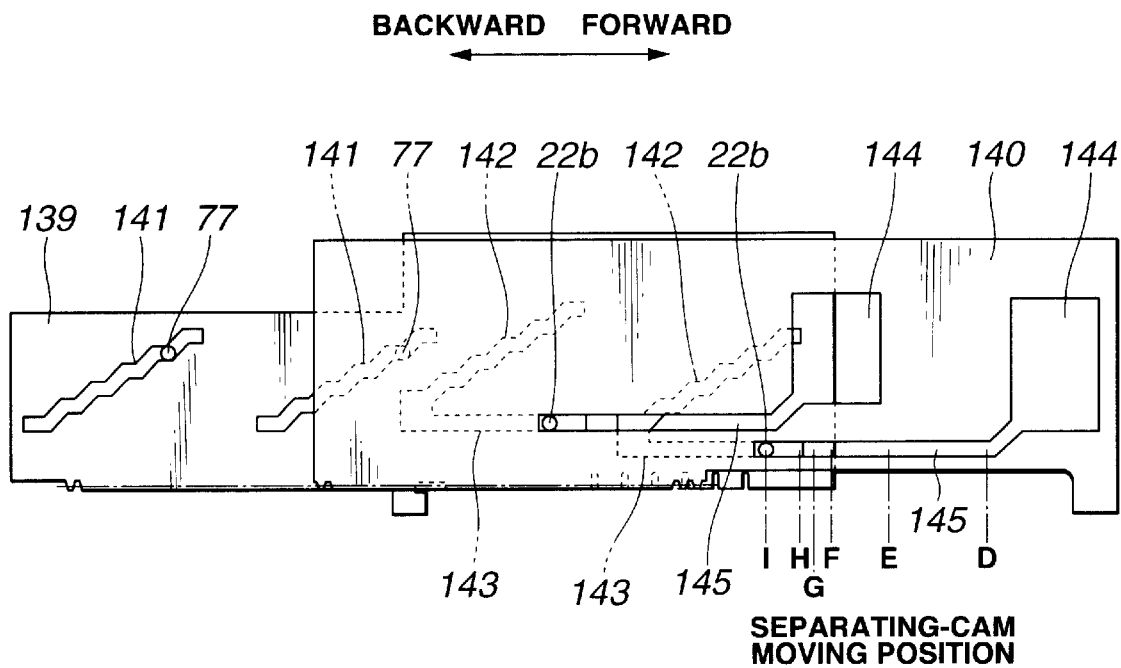

Fig.17
(a)
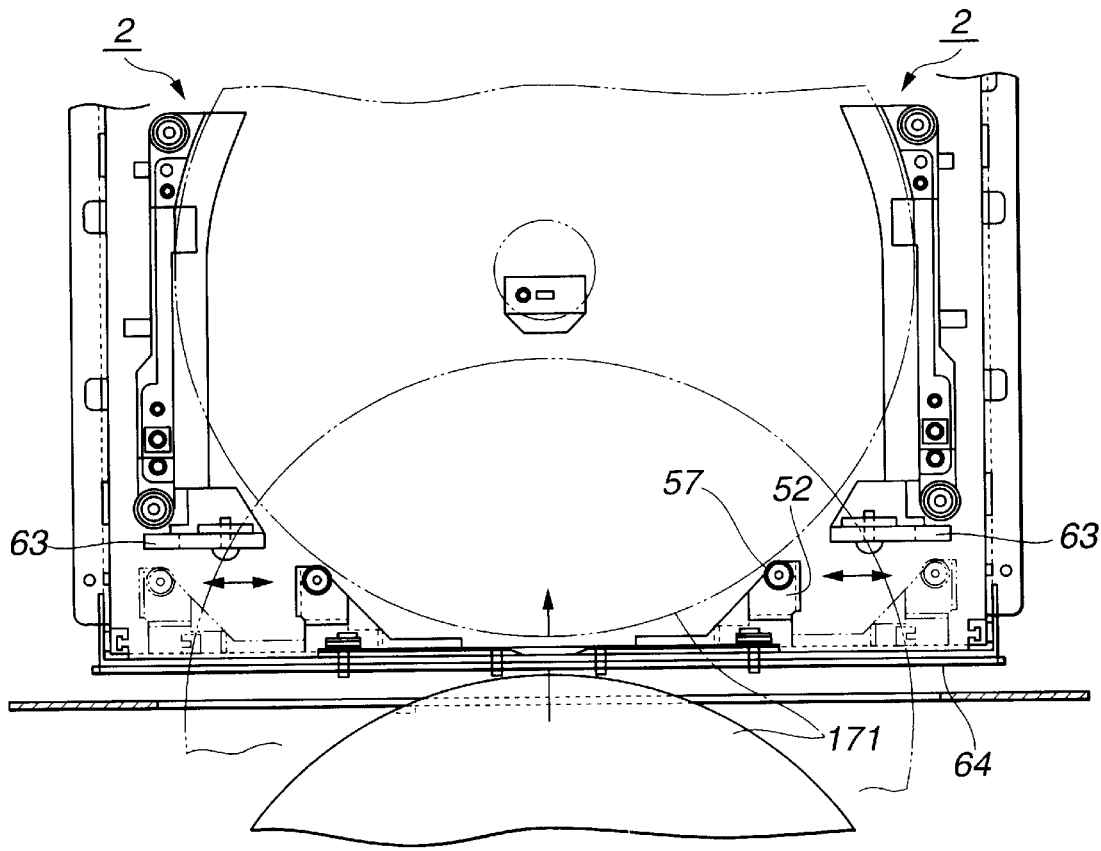
(b)
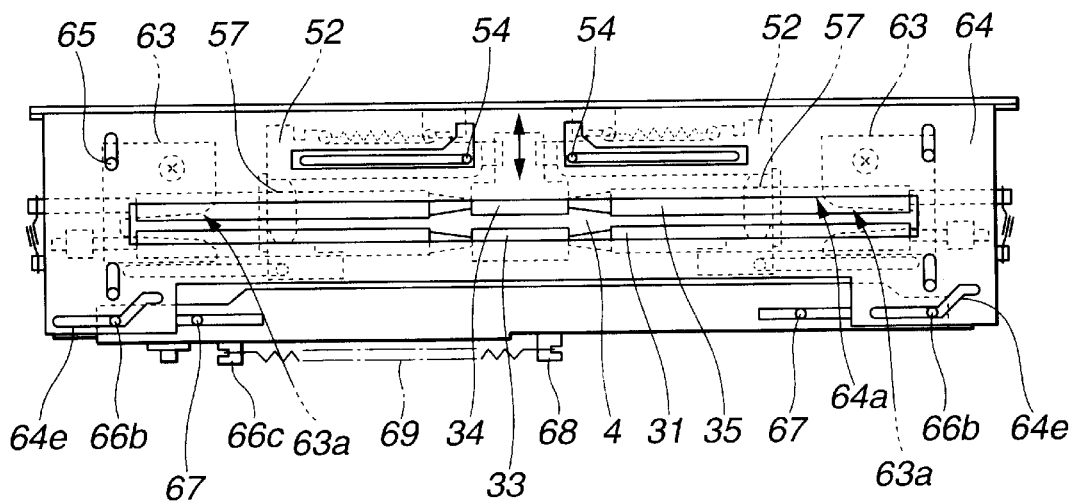

Fig.19
(a)
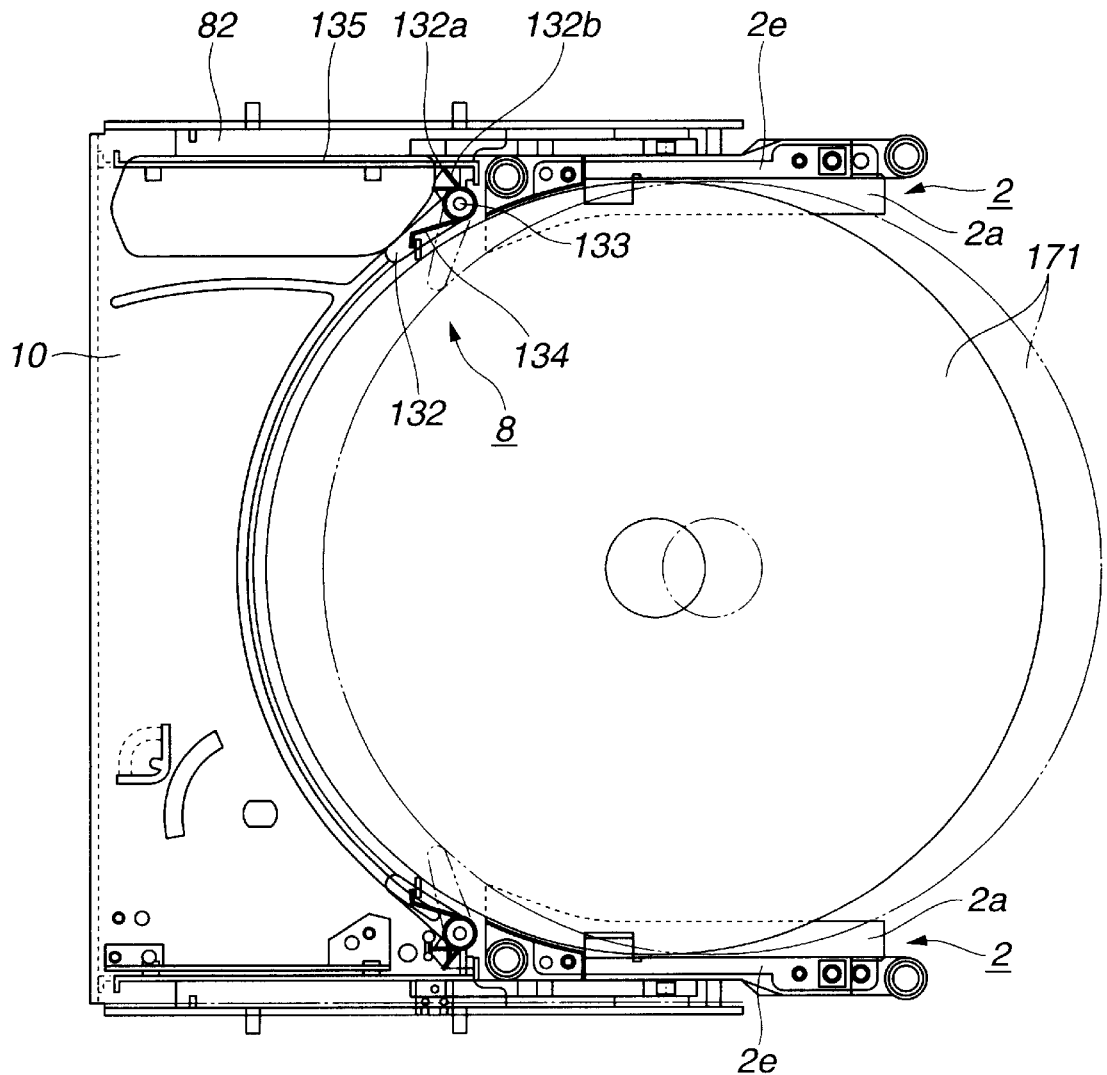
(b)
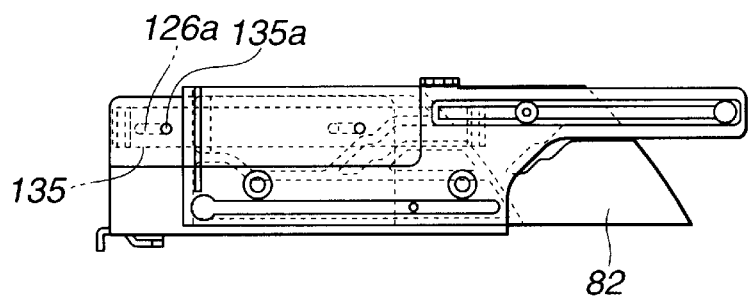

Fig.28
(a)
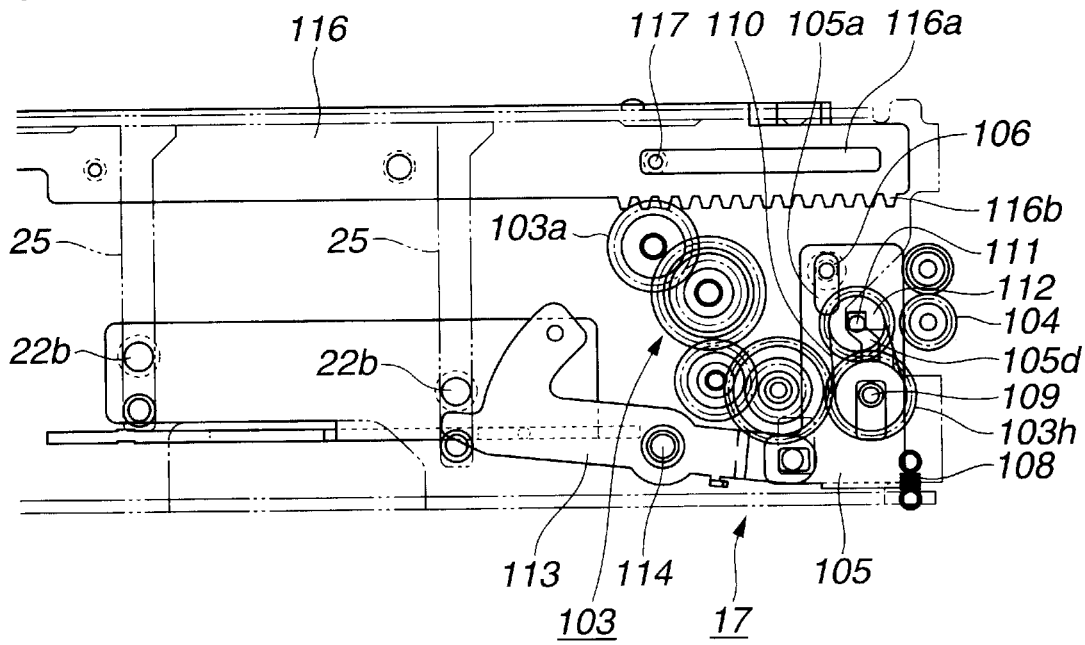
(b)
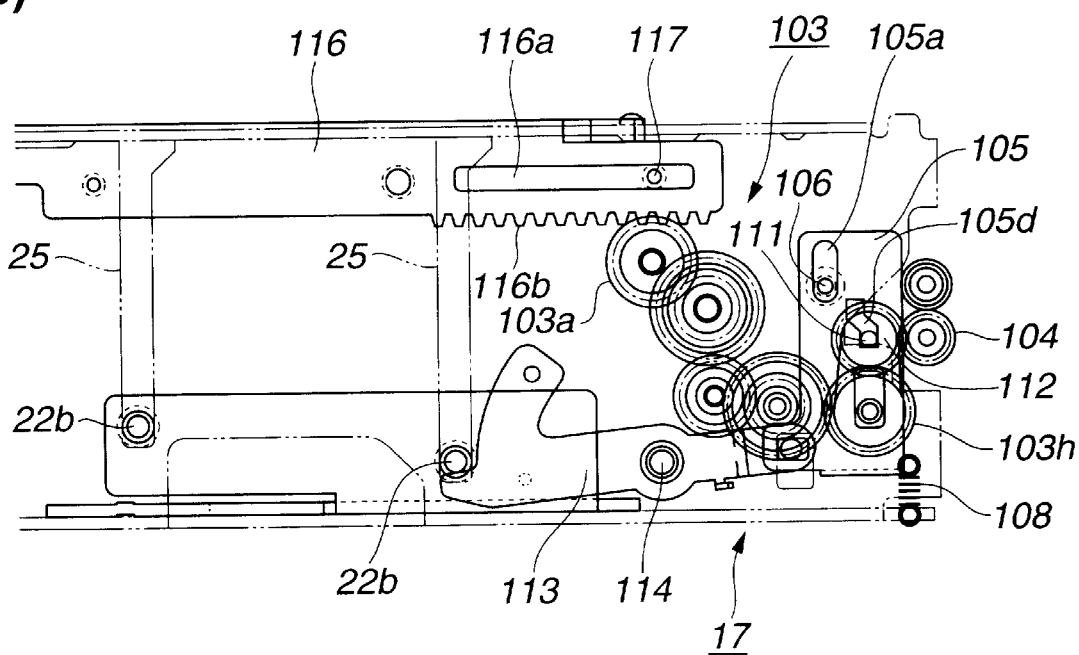

Fig.32
(a)
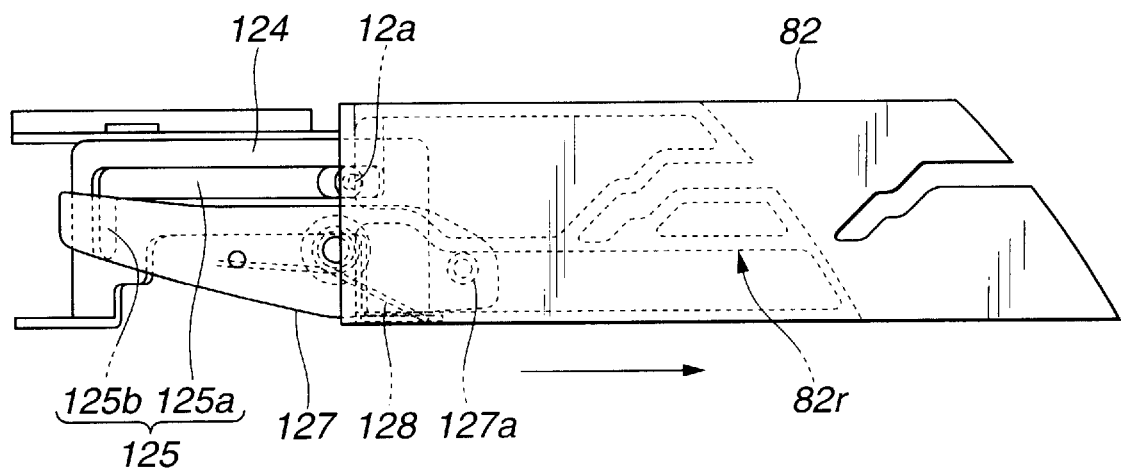
(b)
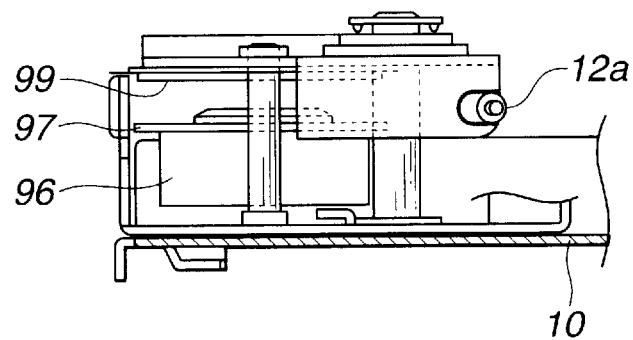

RECORDING AND/OR REPRODUCING DEVICE FOR DISKS

TECHNICAL FIELD

The present invention relates to a disc recording and/or reproducing device for receiving and recording/reproducing a plurality of discs.

BACKGROUND ART

There is a disc player by way of disc recording and/or reproducing device mounted on motor vehicles for recording and/or reproducing sound. The disc player is constructed to store a plurality of CDs (compact discs) in a magazine and change the whole CDs at a time together with the magazine. This leads to a device enlargement, so that the main body is received in a trunk, while only the part necessary for operation is arranged in a cabin. However, changing CDs is not possible during driving of the vehicle, and requires stop thereof to open the trunk, forming a bothersome affair.

On this account, vehicle-mounted disc players to be received in cabins are developed in recent years. Such vehicle-mounted disc player, which is required to enable storage of a plurality of CDs, is received in a predetermined in-dash space in the cabin. Accordingly, there remains an essential challenge of a reduction in size of the vehicle-mounted disc players.

The vehicle-mounted disc player includes a roughly rectangular-prism casing of a given dimension called 1 DIN size or the like, in which, for example, six trays for individually mounting six CDs thereon are placed one upon another to constitute a disc compartment. Six CDs can individually be loaded and ejected to successively select one of six CDs for reproduction.

A prior-art reference 1 of the vehicle-mounted disc player is constructed such that for selecting and reproducing one of six CDs, six trays for mounting CDs are arranged to be placed vertically one upon another, and a male screw having a greater pitch in the middle portion along the length is formed with a shaft arranged through the trays to obtain a screwed shaft. Rotation of the screwed shaft causes the trays to successively rise from the top. When stopping rotation of the screwed shaft with a selected tray mounting selected CD being located in the middle portion of the screwed shaft, spaces are defined above and below the selected tray. Then, a spindle motor and turntable and a pickup unit are inserted below selected CD to engage a claw protruding upwardly from the center of the turntable with a hole of CD through upward motion of the turntable, mounting CD on the turntable. After withdrawing the turntable, CD is rotated for reproduction.

A prior-art reference 2 is constructed such that after moving CD to be reproduced to a predetermined level position by moving a cartridge upwardly or downwardly, spaces are formed above and below CD to be reproduced by space forming means. A turntable and a chucking plate are introduced into the spaces to chuck CD to be reproduced on the turntable, and an optical pickup is moved from a standby position to a reproduction position.

However, the prior-art reference 1 presented the following problem:

Since the device is not configured to hold CD from both sides for rotation, coupling is not sufficient between the turntable and CD to deteriorate the vibration characteristics during reproduction. In some cases, CD can accidentally be detached from the turntable.

The prior-art reference 2 presented the following problems 1) and 2):

1) The cartridge is moved upwardly or downwardly with respect to the optical pickup fixed at the level position shown by H in FIG. 38, so that for moving the cartridge 201 as illustrated by the solid line from the state of reproducing CD 202 on the uppermost stage to the state of reproducing CD 203 on the lowermost stage of the cartridge 201, the cartridge 201 should be raised to the position as illustrated by the two-dot chain line. As a result, a height T1 of a cartridge receiving space is roughly twice as great as a height T2 of the cartridge 201, forming a bottleneck to a reduction in thickness of the disc player.

2) After movement of CD to be reproduced to a predetermined level position, the space forming means are moved toward the CD to form spaces above and below CD to be reproduced. Turntable and chucking plate are introduced into the spaces to chuck CD on the turntable, and the optical pickup is moved from the standby position to the reproduction startup position. Thus, changing CD requires a lot of time.

Additionally, for accommodation of a plurality of CDs, the device needs to hold parts of operation mechanisms for carrying out various operations such as CD loading, ejection, recording, reproduction, etc., leading to difficult reduction in size of the device in its entirety.

DISCLOSURE OF THE INVENTION

Therefore, the present invention aims to provide a disc recording and/or reproducing device that solves such problems.

For achieving such object, the disc recording and/or reproducing device is constructed such that it comprises: a plurality of disc mounting means for mounting discs thereon; a support means for placing said plurality of disc mounting means one upon another and movably supporting them in the placing direction; a disc driving means for driving a rotation supporting means for rotatably supporting a selected disc; a bias means for biasing said plurality of disc mounting means in one side of the placing direction; and a movable control means, provided with a separation control part for moving a selected disc mounting means for mounting the selected disc to another side against said bias means so as to form a first space for disposing said disc driving means on one side of said selected disc mounting means, and for forming said first space.

The disc recording and/or reproducing device is constructed such that, it comprises a position restricting means for restricting, when the disc mounting means exists on one side of said selected disc mounting means, movement of the one-side disc mounting means to another side, wherein the position of the one-side disc mounting means is restricted to form said first space between the selected disc mounting means and the one-side disc mounting means.

The disc recording and/or reproducing device such that, said position restricting means is formed with said control means.

The disc recording and/or reproducing device is constructed such that, said position restricting means comprises a face of said control means along said moving direction.

According to the disc recording and/or reproducing device, the first space is formed on one side of the selected disc mounting means with a selected disc mounted in the placed disc mounting means, into which the rotation supporting means is inserted to mount the selected disc, allowing sure mounting on the disc.

The disc recording and/or reproducing device is constructed such that, it comprises a disc holding means for holding said selected disc between the disc holding means and said rotation supporting means, wherein when the disc mounting means exists on another side of said selected disc mounting means, said control means forms a second space between said selected disc mounting means and said another-side disc mounting means to dispose said disc holding means.

According to such disc recording and/or reproducing device, it comprises a disc holding means for holding said selected disc between the disc holding means and said rotation supporting means, allowing reproduction of the disc in the holding state, resulting in no possible occurrence of disengagement of the disc during reproduction.

The disc recording and/or reproducing device is constructed such that, a pair of said control means is arranged so that movement thereof leads to formation of said first space on one side of the selected disc mounting means.

The disc recording and/or reproducing device is constructed such that, said pair of control means comprises said position restricting means.

According to the disc recording and/or reproducing device, a pair of said control means is arranged, obtaining stabilized support for the disc mounting means.

The disc recording and/or reproducing device is constructed such that, a pair of said separation control parts is arranged to move thereby said selected disc mounting means to another side.

According to such disc recording and/or reproducing device, a pair of said separation control parts is arranged with the control means, obtaining stabilized support for the disc mounting means.

A disc recording and/or reproducing device is constructed such that it comprises: a plurality of disc mounting means for mounting discs thereon; a support means for placing said plurality of disc mounting means one upon another and movably supporting them in the placing direction; a disc driving means for driving a rotation supporting means for mounting and rotatably supporting a selected disc; a disc holding means for holding the disc mounted on said rotation supporting means; a bias means for biasing said disc mounting means in one side of the placing direction; and a control means for forming a first space for disposing said disc driving means on one side of the selected disc mounting means on which the selected disc is mounted, and a second space for disposing said disc holding means on another side thereof, wherein said control means comprises: a first separation control part for moving to said another side said selected disc mounting means and the disc mounting means on another side compared with the selected disc mounting means in accordance with movement of a first half of said control means; a second separation control part for moving to said another side only said disc mounting means on another side compared with said selected disc mounting means in accordance with movement of a second half of said control means; and a third separation control part arranged between the first and second separation control parts and for holding said selected disc mounting means.

The disc recording and/or reproducing device is constructed such that, it comprises a position restricting means for restricting, when the disc mounting means exists on one side of said selected disc mounting means, movement of the one-side disc mounting means to another side, wherein the position of the one-side disc mounting means is restricted to form said first space between the selected disc mounting means and the one-side disc mounting means.

The disc recording and/or reproducing device is constructed such that, said position restricting means is arranged with said control means.

The disc recording and/or reproducing device is constructed such that, said position restricting means comprises a face of said control means along said moving direction.

According to the disc recording and/or reproducing device, spaces are formed on both sides of the selected disc mounting means, into which the rotation supporting means and the disc holding means are inserted, respectively, allowing sure holding of the disc. Therefore, the vibration characteristics are excellent during reproduction, resulting in no occurrence of disengagement of the disc with the rotation supporting means as is produced in the prior art.

The disc recording and/or reproducing device is constructed such that, said third separation control part includes a lowering control part for lowering said selected disc mounting means to dispose said selected disc on the rotation supporting means disposed in said first space.

The disc recording and/or reproducing device is constructed such that, said disc mounting means is arranged with a spring means for pressing the disc from another side, wherein the spring means releases pressing of the disc by said control means.

According to the disc recording and/or reproducing device, there are arranged a lowering control part and a spring means, allowing mounting of the selected disc on the rotation supporting means only by moving the control means and separation of the disc mounting means from the selected disc after holding it, having excellent operability.

A disc recording and/or reproducing device is constructed such that it comprises: a disc compartment comprising a plurality of disc mounting means placed one upon another, on which discs are mounted; a recording and/or reproducing means for selectively recording and/or reproducing a disc mounted on a selected one of said plurality of disc mounting means; an ejection means for ejecting the disc mounted on said disc mounting means; a control means, which moves along a line substantially perpendicular to said placing direction, for starting said recording and/or reproducing means when reaching a first position on one side along the line, and said ejection means when reaching a second position on another side along the line.

The disc recording and/or reproducing device is constructed such that, it comprises a space forming means for moving in the placing direction the disc mounting means in said disc compartment and adjacent to the selected disc mounting means so as to form a first space on one side of the placing direction of the selected disc mounting means, wherein said recording and/or reproducing means ensures action of moving a disc driving means for holding and rotating/driving the disc to the first space formed by said space forming means, and wherein said ejection means ensures action of opening a shutter of a disc loading/unloading opening and moving the disc to said loading/unloading opening.

The disc recording and/or reproducing device is constructed such that, said control means comprises a startup plate having a first engagement engaging with said recording and/or reproducing means and a second engagement engaging with said ejection means.

The disc recording and/or reproducing device is constructed such that, said control means comprises a startup plate having a first engagement engaging with said recording and/or reproducing means and a second engagement engaging with said ejection means.

According to the invention, contradictory action of the recording and/or reproducing means and the ejection means can be ensured by the only one control means (startup plate), so that there is no need to separately arrange a startup means for starting the recording and/or reproducing means and a startup means for starting the ejection means, obtaining simplified device configuration and reduced number of parts, resulting in a reduction in size of the entire device.

A disc recording and/or reproducing device is constructed such that it comprises: a disc compartment comprising a plurality of disc mounting means movably placed one upon another in the placing direction and for mounting discs thereon; a space forming means arranged with a pickup lifting/lowering means moving in the disc placing direction in said disc compartment and for forming spaces on one and another sides of the moving direction of the disc mounting means on which a selected disc is mounted; a rotation supporting means for mounting said selected disc thereon and rotating/supporting it; a disc holding means for holding the disc between the disc holding means and said rotation supporting means; and an optical pickup for recording and/or reproducing the disc mounted on said rotation supporting means.

According to such invention, the optical pickup is vertically moved with respect to the disc compartment, allowing a reduction in device thickness compared with the conventional device wherein the disc compartment is vertically moved with respect to the optical pickup. Moreover, the optical pickup and the space forming means are moved vertically simultaneously by the pickup lifting/lowering means allowing simplified structure and reduced time for disc change accordingly.

The disc recording and/or reproducing device is constructed such that, said space forming means is movably arranged with said pickup lifting/lowering means, and said rotation supporting means is rotatably arranged with a hold means rotatably provided with said pickup lifting/lowering means.

According to such invention, a series of actions of vertically moving the pickup lifting/lowering means up to the position of the selected disc before sliding the space forming means to form spaces above and below the selected disc and rotating the hold means allows movement of the rotation supporting means to the position of the selected disc.

The disc recording and/or reproducing device is constructed such that, said hold means comprises: a first arm provided with said rotation supporting means; a second arm provided with said disc holding means; and a restriction means for moving said disc holding means and restricting movement thereof.

According to such invention, the rotation supporting means and the disc holding means are moved to the center of the selected disc by the first and second arms of the holding means before moving the disc holding means, allowing the selected disc to be held (chucked) on the rotation supporting means.

The disc recording and/or reproducing device is constructed such that, said restriction means includes a first restriction means for restricting movement of said disc holding means, and a second restriction means for releasing restriction by the first restriction means.

According to such invention, the restriction means arranged with the hold means allows sure achievement of holding and releasing of the disc by the disc holding means.

The disc recording and/or reproducing device is constructed such that, said optical pickup is movably arranged with said first arm.

According to such invention, by rotating said first arm after moving in advance the optical pickup to the side of the rotation supporting means at the head of the first arm, the pickup is moved to the recording/reproduction start position at the instant when the rotation supporting means is moved to the disc mounting position, allowing a further reduction in time for disc change.

A disc recording and/or reproducing device is constructed such that it comprises: a disc compartment comprising a plurality of disc mounting means placed one upon another, on which discs are mounted; a bias means for providing a pressing force on one side of said placing direction in said disc compartment to stabilize said disc mounting means; and a space forming means, moved in the direction substantially perpendicular to the placing direction of said disc mounting means, for moving said disc mounting means to another side against the pressing force of said bias means, said space forming means having a circular part formed in a portion thereof abutting on said disc mounting means so as to obtain a substantially uniform load during said movement.

According to such invention, the circular part of the space forming means includes a circular arc providing substantially uniform load during movement, obtaining the substantially same power load for the space forming means in any of the initial, middle and final stages of separating action for separating the disc mounting means in the placing direction. As a result, the efficiency is significantly excellent for power for driving the space forming means.

Moreover, the circular part of the space forming means has shorter stroke than the conventional inclined line at a predetermined angle, allowing reduced dimension of the space forming means in the moving direction (direction perpendicular to the placing direction of the disc mounting means), leading thereby to possible reduction in size of the entire device.

BRIEF DESCRIPTION OF THE DRAWINGS

FIG. 10 shows positioning means, wherein (a) is a rear view when the holding means are positioned in the standby position, and (b) is a rear view when they are positioned in the reproduction position;

FIG. 11 show operating means, wherein (a) is a front view of a pickup lifting/lowering stage and a disc lifting/lowering stage, (b) is a front view of an inner slider, and (c) is a front view of an outer slider;

FIG. 13 show case of loading/unloading the top but one CD, wherein (a) is an operation explaining view of the operating means in the standby state where the second CD is selected, and (b) is an operation explaining view of the operating means with a shutter opened;

FIG. 15 show state of reproduction mode for carrying out CD reproduction, wherein (a) is an operation explaining view of the operating means when the top but five CD is reproduced, and (b) is an operation explaining view of the operating means when the topmost CD is reproduced;

FIG. 16 show case of reproducing the top but one CD, wherein (a) is an operation explaining view of the operating means when a pin is in (D) position or standby state, and (b) is an operation explaining view of the operating means when the pin is in (I) position or reproduction state;

FIG. 17 show the disc player upon CD loading, wherein (a) is a plan view, and (b) is a front view;

FIG. 19 show push means upon CD ejection, wherein (a) is a plan view, and (b) is a front view;

FIG. 28 show torque providing means, wherein (a) is an operation explaining view when torque is not provided, and (b) is an operation explaining view when torque is provided;

FIGS. 32(a) and (b) show an operation explaining view showing the state of restriction means when the hold means occupy the standby position;

BEST MODE FOR CARRYING OUT THE INVENTION

Figure 1:
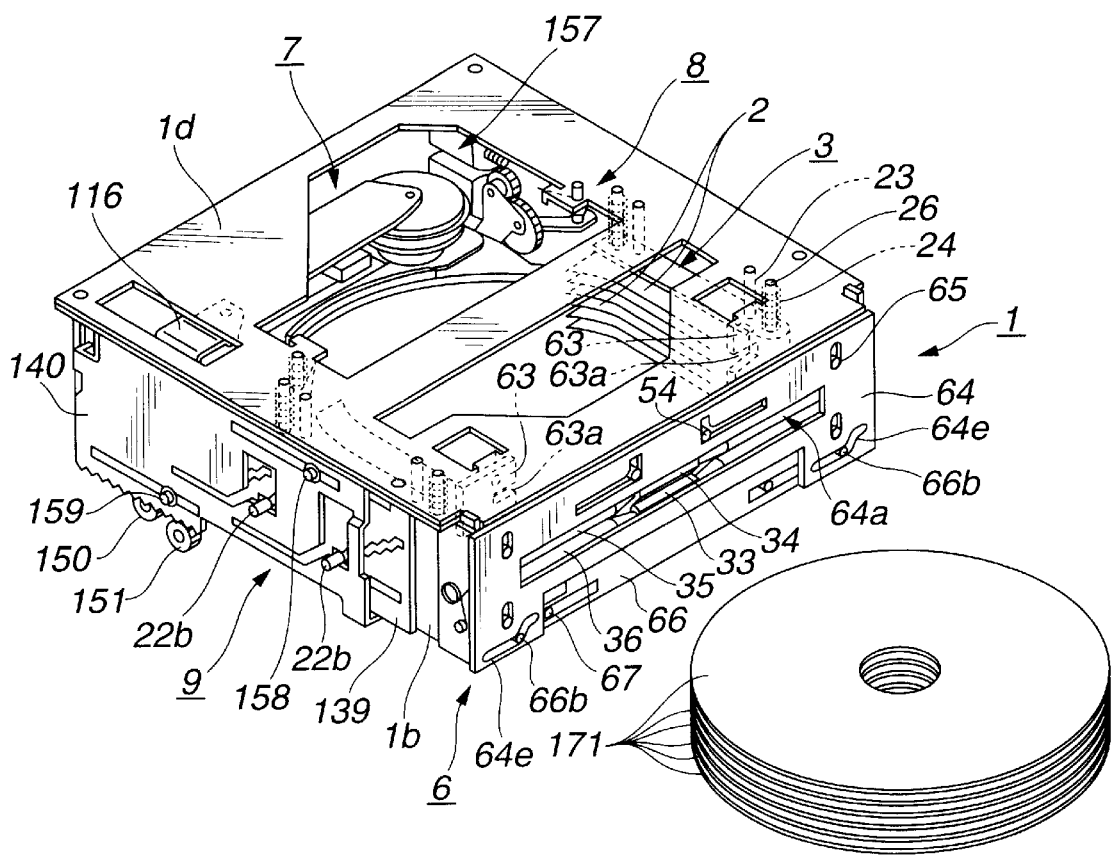
FIG. 1 is an exploded perspective view of the appearance of a disc player showing an embodiment of a disc recording and/or reproducing device according to the present invention.

A description is made hereafter with regard to the best mode of a disc recording and/or reproducing device according to the present invention. The best mode is a mode that the present invention is applied to a disc player for reproducing sound.

(A) General Configuration for the Structure of Disc Player

FIGS. 1–11 show a disc player which constitutes a preferred embodiment. The disc player comprises a casing 1 for defining an external shape, a disc compartment 3 disposed in the casing 1 on the front side for storing CDs, transfer means 5 arranged in a loading/unloading opening 4 of a front plate 1a of the casing 1 and for loading and ejecting CDs from the disc compartment 3, opening/closing means 6 arranged on the front side of the transfer means 5 and for opening and closing the loading/unloading-opening 4 of the front plate 1a, reproduction means 7 disposed in the casing 1 on the rear side and for selecting and reproducing any one of CDs in the disc compartment 3, push means 8 arranged in the disc compartment 3 on the left and right of the rear side and for pushing CD to be ejected toward the transfer means 5, and operation means 9 arranged mainly outside left and right side plates 1b, 1c of the casing 1 and for operating the disc compartment 3, the reproduction means 7, etc.

The reproduction means 7 comprise space defining means 11 disposed on both sides of a pickup lifting/lowering stage (pickup lifting/lowering means) 10 which moves vertically and for defining a space (first space) below a selected one of CDs in the disc compartment 3 and a space (second space) thereabove, hold means 14 comprising a lower arm (first arm) 13 and an upper arm (second arm) 12 which are rotatably arranged on the pickup lifting/lowering stage 10 and entering in the spaces for holding the selected CD, disc driving means 15 mounted to the lower arm 13 and for driving the held CD, a pickup unit 16 mounted to the lower arm 13 and for reading information on the rotating CD, torque providing means 17 for transmitting torque to the hold means 14 only in the reproduction mode wherein CD is reproduced and not in the loading/unloading mode wherein CD is loaded or unloaded, and restriction means 18 for setting a timing where the hold means 14 hold CD.

(B) Casing

The casing 1 comprises front plate 1a, side plates 1b, 1c, top plate 1d, and bottom plate 1e, and has a rear open. The side plates 1b, 1c and the bottom plate 1e are integrated with each other.

(C) Disc Compartment

As shown in FIG. 3(a), in the embodiment, the disc compartment 3 comprises six trays (disc mounting means) 2 and a disc lifting/lowering stage 22 mounting the six trays 2 thereon, and is supported by four guide supports (support means) 23 extending vertically and having both ends connected to the bottom plate 1e and the top plate 1d.

Figure 4:
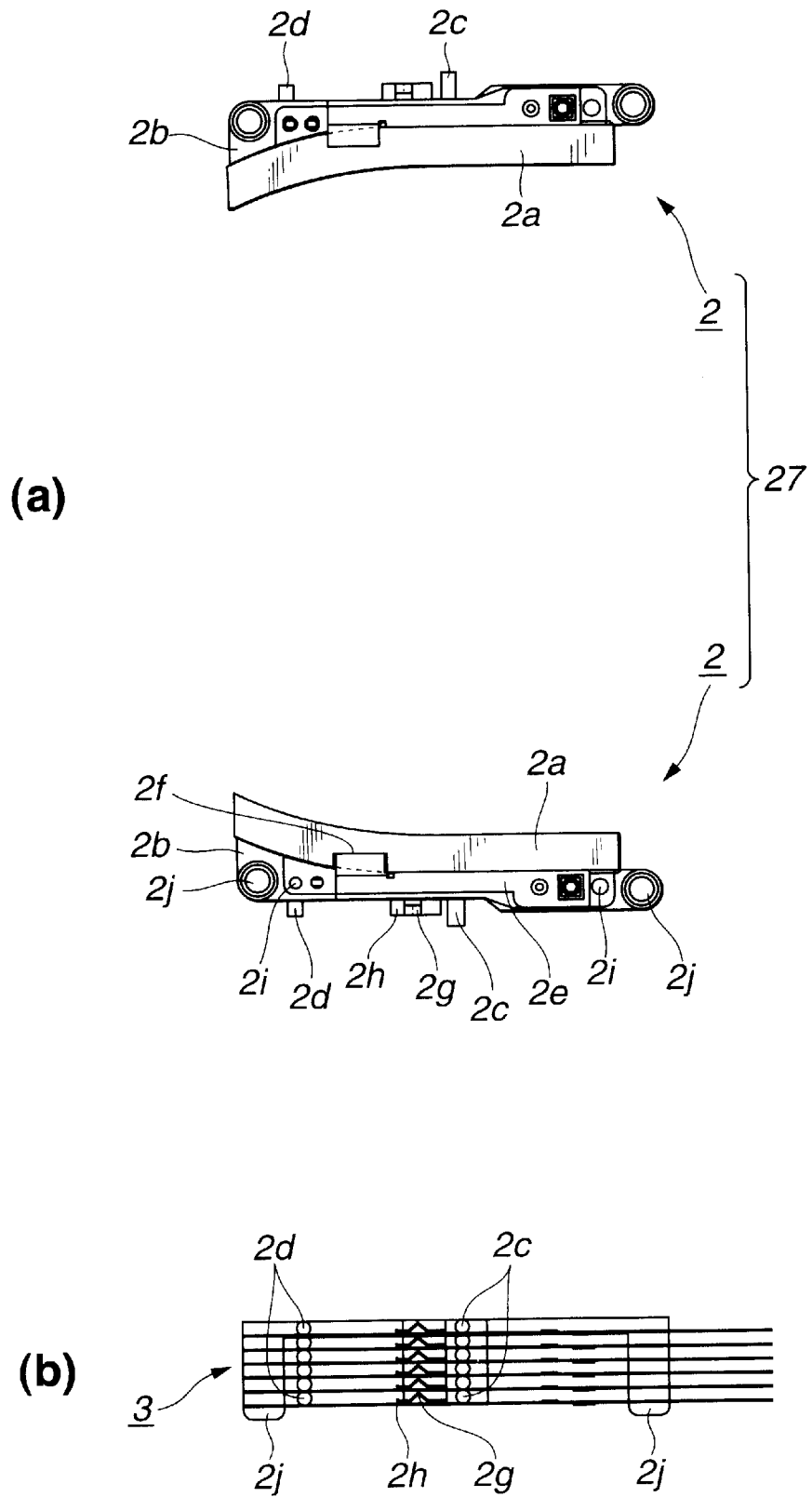
FIG. 4 show the disc compartment in the disc layer, wherein (a) is a plan view, and (b) is a front view.

As shown in FIG. 4, resins 2b are placed on both sides of the upper face of a thin aluminum plate 2a. A pair of pins 2c, 2d is arranged on each resin 2b in the middle and rear portions to protrude laterally. The front pin is longer than the rear pin. The height of the resin 2b is set to be substantially the same as the thickness of CD. A front portion of plate springs (spring means) 2e is secured to the upper face of the resin 2b to hold CD between the spring and the aluminum plate 2a.

A presser 2f is formed on the rear inside of the plate spring 2e for pressing CD, whereas formed on the rear outside of the plate spring 2e are a receiver 2g pressed downward by the lower face of a separating cam 82 as described later, and a receiver 2h undergoing an upward force from the lower face of an upper-stage engagement 82j as described later. In front and rear portions of the respective resins 2b, guide holes 2i are formed through the resins 2b and the aluminum plate 2a to receive the guide supports 23. Pads, not shown, are circularly placed on both faces of the aluminum plate 2a in a portion which the vicinity of the outer peripheral face of CD contacts. As shown in FIG. 3(a), cylindrical spring bearings 2j are integrated with both ends of the resin 2b of the uppermost tray 2 so as to receive coil springs (bias means) 24 arranged between the top plate 1d and the uppermost tray 2. As shown in FIG. 3b, a lower end of the spring bearing 2j slightly protrudes inward to form a receiver 2k that receives a lower end of a coil spring 24. This is arranged to prevent a load required for compression from excessively being greater even if the compression length is larger with use of a long spring.

On the other hand, the disc lifting/lowering stage 22 has both ends bent upward. Guide holes 22a are formed in a horizontal part of the stage to receive the guide supports 23, and a pair of pins 22b is secured to outer faces of left and right vertical parts of the stage to protrude horizontally. The pair of pins 22b protrudes outside the casing 1 through two vertical slits 25 formed in the respective side plates 1b, 1c of the casing 1.

The disc lifting/lowering stage 22 and the six trays 2 are vertically movably supported by arranging the guide supports 23 through the guide holes 22a, 2i. Four spring guides 26 have respective upper and lower ends secured to the top plate 1d and the bottom plate 1e of the casing 1, each spring guide being arranged through the spring receiver 2s. A lower end of the coil spring (bias means) 24 arranged to enclose the spring guide 26 abuts on the receiver at the lower end of the spring receiver 2i.

(D) Transfer Means

Figure 2:
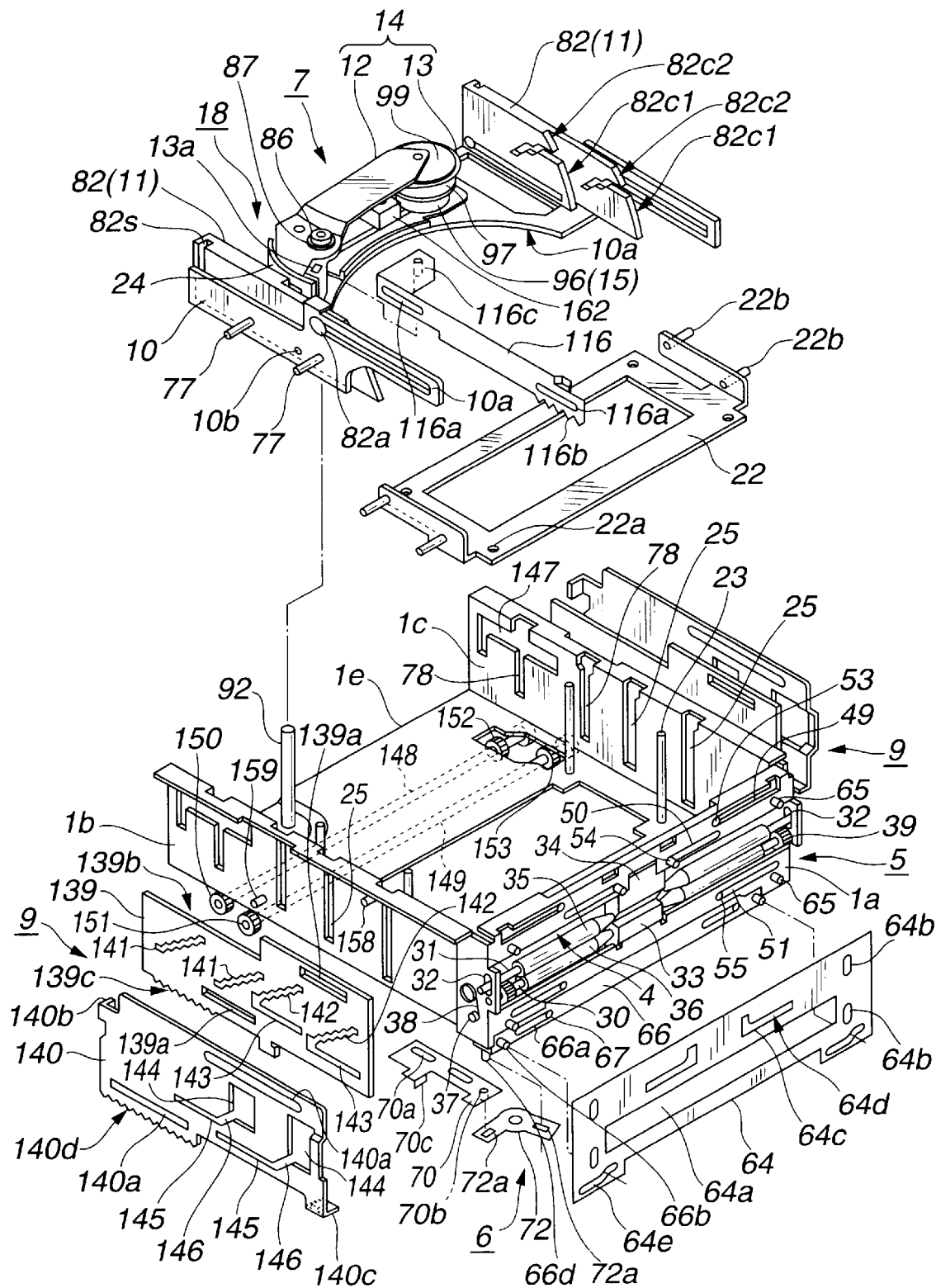
FIG. 2 is an exploded perspective view of the disc player.
Figure 12:
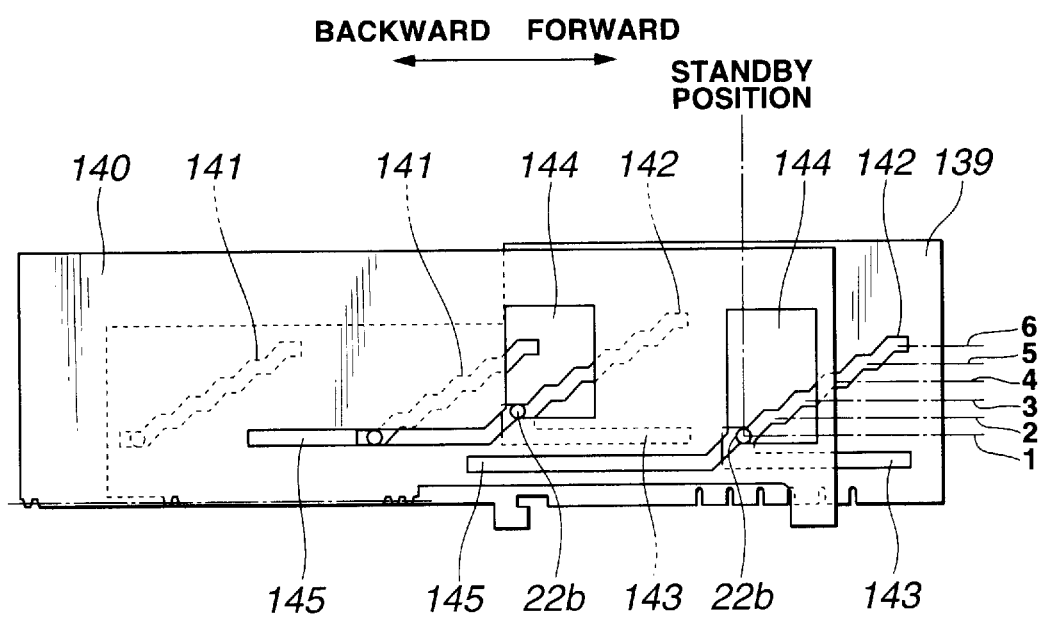
FIG. 12 is an operation explaining view of the operating means, showing the mode switching position in the state of loading/unloading mode for carrying out CD loading and ejection.

As shown in FIG. 2, the transfer means 5 are arranged with the front plate 1a of the casing 1. The loading/unloading opening 4 is formed in the front plate 1a. A drive shaft 30 and a driven shaft 31 are rotatably supported in the loading/unloading opening 4. Both ends of the drive shaft 30 are rotatably mounted to the front plate 1a, whereas both ends of the driven shaft 31 are arranged through a vertically extending slot 32 formed in a side face of the front plate 1a. As shown in FIG. 12, in order to support the middle of the drive shaft 30 and the driven shaft 31, a small-diameter portion of the middle of the drive shaft 30 is rotatably engaged with a groove 33a formed in the rear face of a resin bearing 33 having restricted downward movement. A small-diameter portion of the middle of the driven shaft 31 is rotatably engaged with a groove 34a formed in the rear face of the vertically movable resin bearing 34 through a pair of guide protrusions and a pair of guide grooves, not shown. A pair of rubber rollers 35 is mounted to the driven shaft 31, and a pair of rubber rollers 36 is mounted to the drive shaft 30, wherein axial slide of each is restricted by a retaining ring, not shown. Circular grooves are formed at both ends of the drive shaft 31. A spring 38 for biasing the driven shaft 31 toward the drive shaft 30 has both ends engaged with a spring pin 37 secured to the side face of the front plate 1a and the circular groove.

Figure 6:
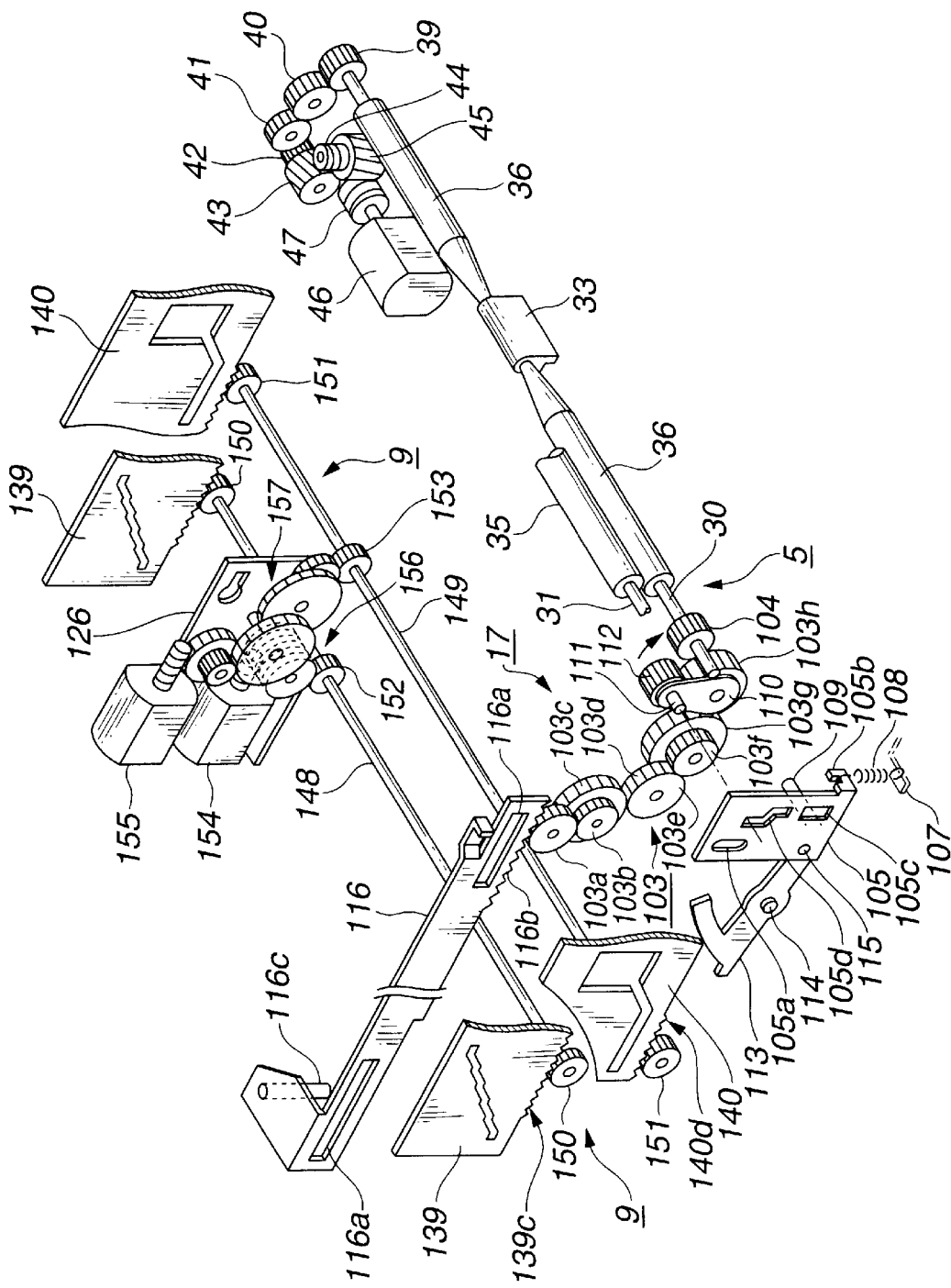
FIG. 6 is an exploded perspective view of transfer means, torque providing means, etc.

Next, means for driving the drive shaft 30 will be described. As shown in FIG. 6, a gear 39 is secured to a right end of the drive shaft 30, and gears 40, 41 and gears 42, 43 integrated with each other are rotatably supported by the inside of the right side face 1c. A worm 44 meshed with the gear 43 and a gear 45 are integrally rotatably supported on the bottom plate 1e, and a worm 47 is meshed with the gear 45 and secured to an output shaft of a transfer motor 46 mounted to the bottom plate 1e.

Figure 5:
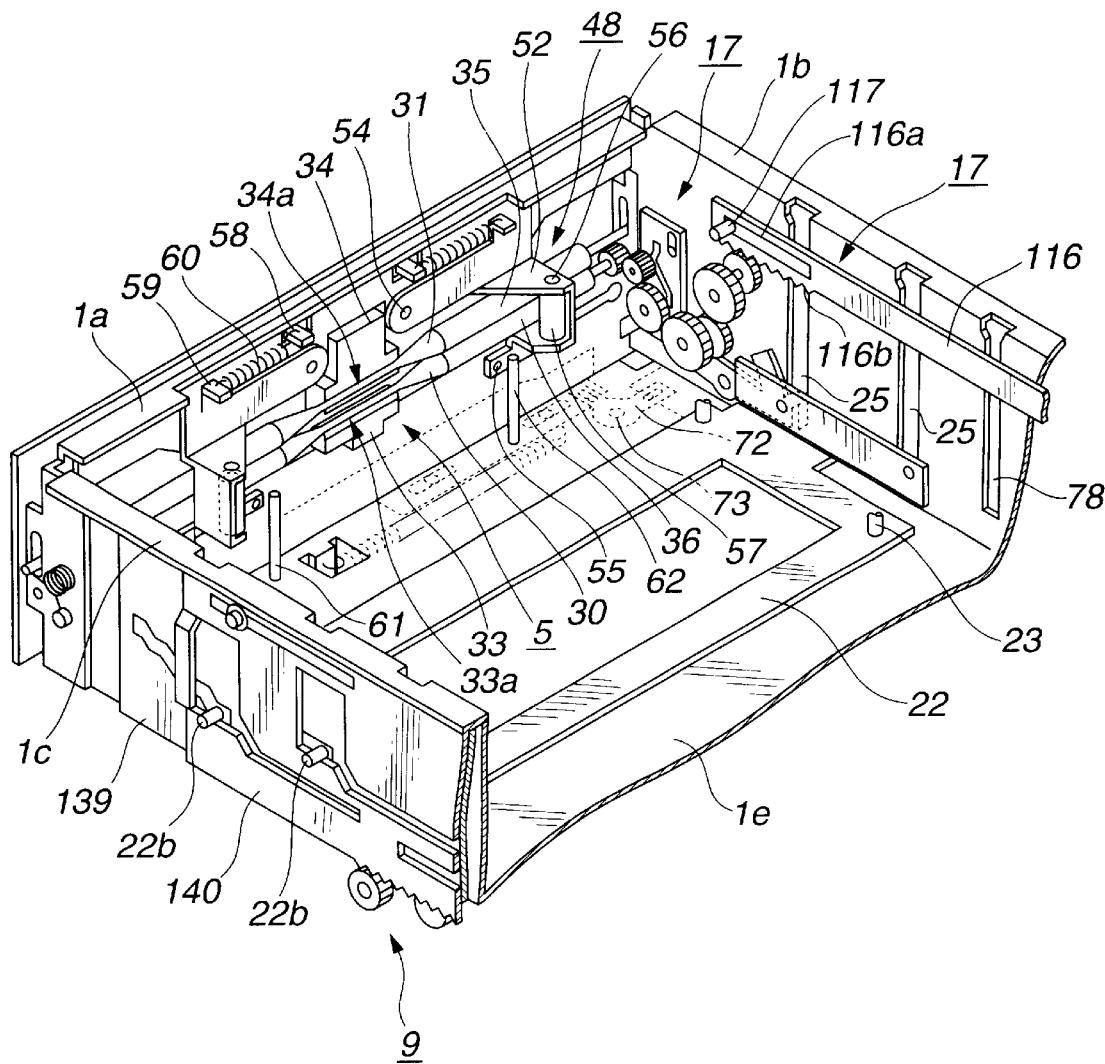
FIG. 5 is a perspective view of the inside of a casing as seen from the rear side.

As shown in FIGS. 2 and 5, press means 48 are arranged to automatically ensure operation of further pressing CD by a few millimeters after completion of CD loading by the rollers 35, 36. Three pairs of horizontally extending guide slots 49, 50, 51 are formed in the front plate 1a above and below the loading/unloading opening 4. A pair of slide mounts 52 is arranged on left and right sides and at the rear of the front pate 1a, and three guide pins 53, 54, 55 are secured to the slide mounts 52 and irremovably arranged through the guide slots 49, 50, 51. A resin vertical roller 57 is rotatably supported to the corresponding slide mount 52 in the rear portion through a vertical shaft 56. In order to bias the slide mounts 52 in the direction of approaching each other, a push spring 60 is arranged between a spring engagement 58 formed with the front face 1a and a spring engagement 59 formed with the slide mount 52.

CD at the level position corresponding to that of the vertical roller 57 is positioned horizontally by the vertical roller 57, whereas CDs above and below the vertical roller 57 are positioned by a pair of positioning rods 61, 62 vertically mounted to the bottom plate 1e as shown in FIG. 5 and a pair of positioning rods, not shown, vertically mounted to the top plate 1d. (The unillustrated positioning rods are disposed on an elongation of the positioning rods 61, 62, and a space is defined between the positioning rods 61, 62 and the unillustrated positioning rods to allow passage of CD to be loaded and unloaded).

(E) Opening/closing Means

The opening/closing means 6 for opening and closing the loading/unloading opening 4 of the front face 1a will be described. A shutter 64 is vertically movably mounted to the front plate 1a on the front face as shown in FIG. 2. An opening 64a is formed in the shutter 64 to allow passage of CD, wherein when the shutter 64 is raised, the middle level position of the opening 64a corresponds to a boundary position between the rollers 35, 36 to have the opening 64a "open", and when the shutter 64 is lowered, the opening is "closed".

Specifically, a pair of upper and lower guide pins 65 is mounted to the front plate 1a on left and right sides, and a pair of vertically extending guide slots 64b is formed in the shutter 64. A retaining ring is engaged with a head of each guide pin 65 arranged through the guide slots 64b. In order to have a distance between the slide mounts 52 larger only when the shutter 64 is raised to "open", the guide pins 54 in the vicinity of the center are set to be longer than the other guide pins 53, 55, and a pair of L-shaped guide holes 64c is formed in the shutter 64 to receive the respective guide pins 54. A guide rail 64d is formed with the upper face of each guide hole 64c so that the shutter 64 is forcibly raised to "open" when CD is ejected by constraint in enlarging the distance between the vertical rollers 57 for some reason.

A link mechanism for opening and closing the shutter 64 will be described. Laterally extending guide slots 66a are formed in front and lower faces of a laterally slide plate 66 with roughly L-shaped section, and guide pins 67 are arranged through the guide slots 66a and secured to the front plate 1a and the bottom plate 1e. Cam holes 64e are formed in the shutter 64 on both sides and in the lower portion, whereas slide pins 66b are secured to the laterally slide plate 66 on both sides and on the front face, and are arranged through the respective cam holes 64e. As shown in FIG. 17(b), spring engagements 66c, 68 are formed with the lower faces of the laterally slide plate 66 and the bottom plate 1e to protrude downward, and a return spring 69 is provided between the two. A longitudinally slide plate 70 is longitudinally slidably mounted to the left lower face of the bottom plate 1e. Specifically, a pair of guide slots 70a is formed in the longitudinally slide plate 70, and a pair of headed pins, not shown, is arranged through the guide slots 70a and secured to the bottom plate 1e. A roughly L-shaped lever 72 has a bent rotatably mounted to the lower face of the bottom plate 1e through a stationary shaft 73 as shown in FIG. 5, and ends formed with respective slots 72a. Pins 66d, 70b are secured to the laterally slide plate 66 and the longitudinally slide plate 70 and loosely engaged with slots 72a, respectively. A pressed portion 70c, pressed by an outer slider 140 as described later, is formed with the longitudinally slide plate 70.

(F) Reproduction Means

The reproduction means 7 are disposed close to the rear of the disc compartment 3 to minimize the depth of the disc player. Since the hold means 14 in the reproduction means 7 are mounted to the pickup lifting/lowering stage 10 as shown in FIG. 2, a description will be made first with regard to the pickup lifting/lowering stage 10.

The pickup lifting/lowering stage 10 comprises a horizontal plate and vertical plates disposed on both sides and integrated with the horizontal plate. A circular recess 10a is formed in the horizontal plate in the front portion to allow CD insertion. A pair of horizontally protruding pins 77 is secured to each vertical plate to move vertically the pickup lifting/lowering stage 10. The pair of pins 77 is positioned at the same level, and is shorter than the pair of pins 22b of the disc lifting/lowering stage 22. The pins 77 are arranged through a pair of vertical slots 78 formed in the side plates 1c, 1b of the casing 1 to protrude outward.

1) Space Forming Means (or Control Means)

As shown in FIG. 2, the separating cams 82 made of resin are longitudinally slidably arranged inside the vertical plates of the pickup lifting/lowering stage 10, which serve as space forming means (or control means) 11 inserted between the two vertically adjacent trays 2 for forming spaces above and below the selected CD. Specifically, a guide slot 10a is formed in the vertical plate of the pickup lifting/lowering stage 10 in the upper front portion, and a headed guide pin 82a is arranged through the guide slot 10a and secured to the separating cam 82. As shown in FIG. 3(a), a guide slot 82b is formed in the separating cam 82 in the lower portion, and a headed guide pin 10b of FIG. 2 is arranged through the guide slot 82b and secured to the vertical plate in the longitudinally middle portion.

The separating cams 82 are inserted between the trays 2 to lift the four pins 2c, 2d arranged both sides of the tray 2, thereby stably supporting the tray 2 and forming spaces above and below the tray 2 mounting thereon CD to be reproduced. The separating cams 82, having the shape obtained by placing two plates of different longitudinal lengths formed with a slit, slip into both sides of the tray 2 to move upward the pair of long pins 2d of the tray 2 through the front portion and the pair of short pins 2d through the rear portion.

Specifically, the configuration is as follows. A pair of first separating control parts $82c_1$, $82c_1$ is formed to move upward the tray (selected disc mounting means) 2 for mounting the selected CD and the tray(s) 2 thereabove, whereas a pair of second separating control parts $82c_2$, $82c_2$ is formed above the respective first separating control parts $82c_1$ to move upward only the tray(s) 2 above the selected tray 2. Third separating control parts 82d are formed between the first separating control parts $82c_1$ and the second separating control parts $82c_2$, respectively, for holding only the selected tray 2. The first separating control part $82c_1$, second separating control part $82c_2$, and third separating control part 82d constitute a separating control part. Formed with the separating cam 82 along the moving direction are a top face 82f for holding the position of the pins 2c, 2d of the tray(s) 2 above the selected tray 2, and a lower face (position restriction means) 82h for holding the position of the pins 2c, 2d of the tray(s) 2 below the selected tray 2 and retaining the receiver 2g of the plate spring 2e.

Figure 21:
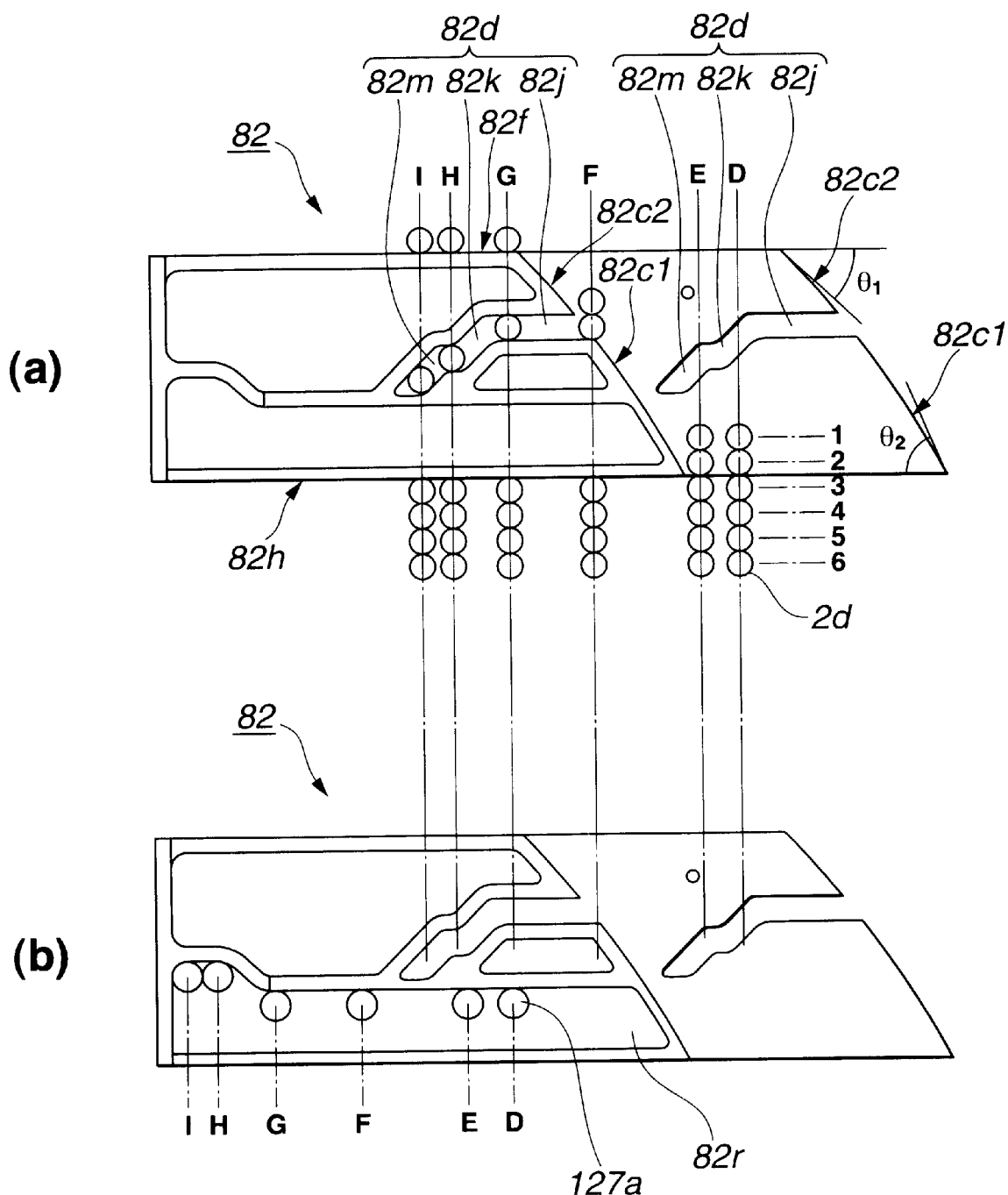
FIG. 21 show operation of a separating cam, wherein (a) is an operation explaining view illustrating the relationship with the trays, and (b) is an operation explaining view illustrating the relationship with the pin.

The pins 2c, 2d of the selected tray 2 and the tray(s) 2 thereabove are lifted up by forward movement of the first and second separating control parts $82c_1$, $82c_2$, so that θ is fundamentally set to a predetermined value, e.g. 45°. Here, however, the trays 2 are lifted in compressing the coil springs 24, so that as the position of the tray 2 is higher, the amount of compression of the coil springs 24 is greater to increase a load acting upon lifting of the tray 2. That is, a load is smaller at an initial stage of compression of the coil springs 24. As a result, as shown in FIG. 21(a), $θ_1$ in an upper portion of the first and second separating control parts $82c_1$, $82c_2$ is set, e.g. to 45° due to larger load, and $θ_2$ in a lower portion is set, e.g. to 60° due to smaller load, with the middle portion of the two including a circular face to have a constant load.

Figure 35:
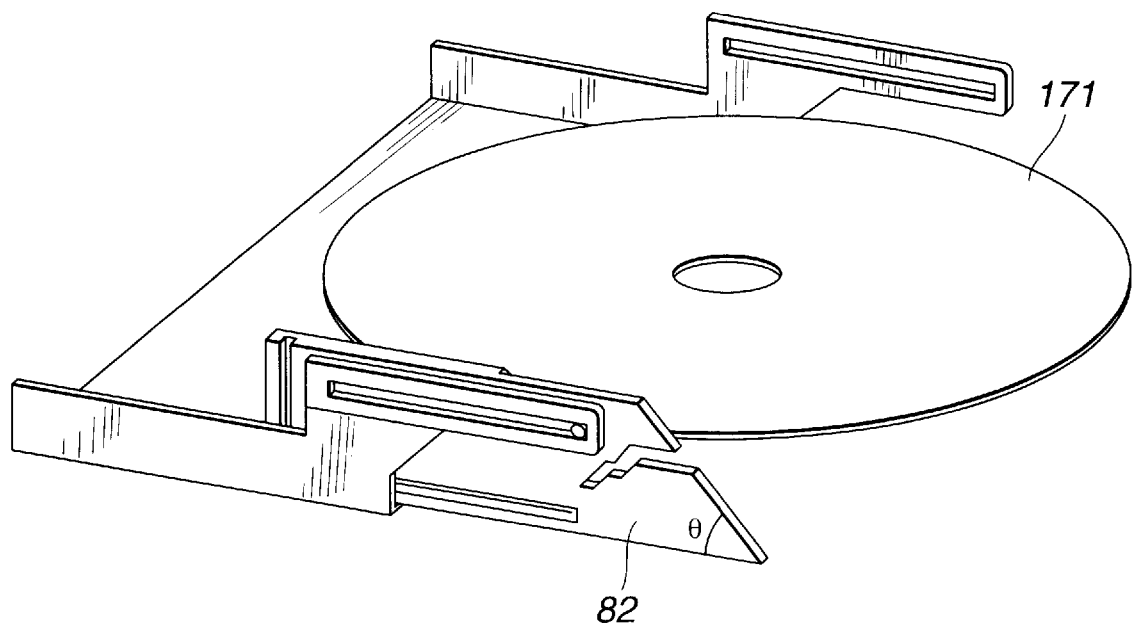
FIG. 35 is a perspective view of the main part for explaining that a taper face of a typical separating cam is linear.

FIG. 35 shows an example of reference of the separating cam 82. In order to horizontally move the separating cam so as to raise the tray 2, the cam was designed typically with a linear taper face of cam angle θ of 45° or less. However, in the case of the cam shape in FIG. 35, the level to be raised by the cam and the cam stroke are limited to 1:1, so that the cam stroke is longer, leading to enlarged device size.

Figure 36:
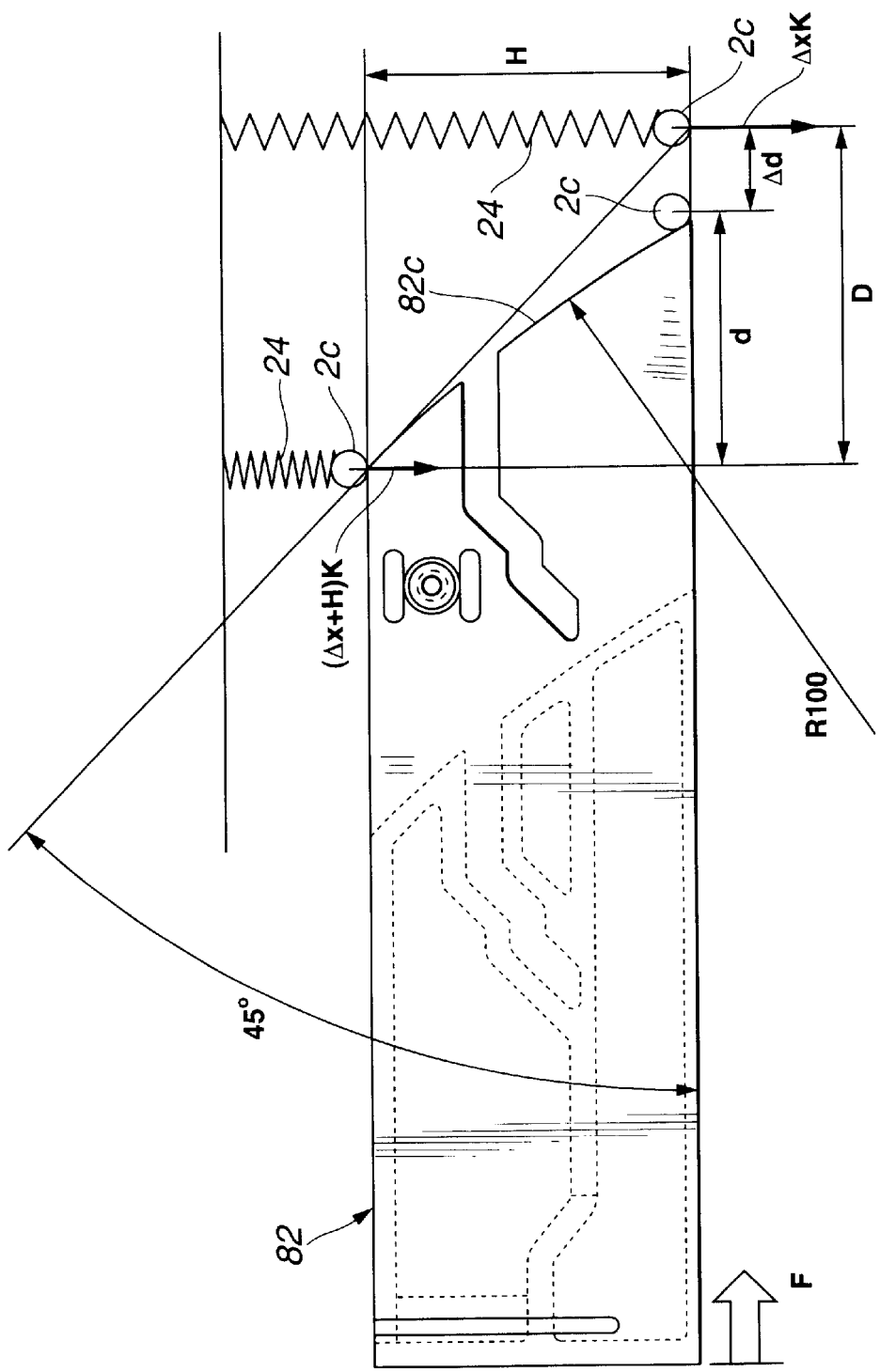
FIG. 36 is an explanatory view showing the dynamical relationship for the separating cam.

FIG. 36 is an explanatory view showing the dynamical relationship of the separating cam, illustrating a manner that the separating cam 82 moved rightward by a horizontal power F lifts the pin 2c of the tray 2 pressed by the coil spring 24. In this drawing, when moving the pin 2c from below to above, and if a taper face (circular portion) 82c is formed with a 45° line, the separating cam 82 should be moved by a distance D.

However, when the taper face 82c is formed with, e.g. a circular portion (substantially circular arc, curve) of shorter stroke than 45° line as the present invention, the separating cam 82 only needs movement of a distance d, resulting in a reduction in distance of movement by Δd and a possible reduction in size of the separating cam 82 by Δd.

The power F for the separating cam will be considered. Assuming that the spring constant is K, a pressing force resulting from the coil spring 24 is increased from Δ xK to (Δx+H)K, i.e. by HK. Thus, in the case of the above linear cam, a load is smaller at the initial stage, but maximum at the final stage, having poor efficiency.

Then, in the present invention, the optimum curve is calculated to obtain the same level of load throughout the entire stroke, which is applied the taper face 82c. The optimum curve is a curve which has, e.g. R100, and contacts a 45 degree line in the upper portion and a 60 degree line in the lower portion. The optimum line is not limited to the curve contacting 45 degree line, and may be a curve contacting a line inclined at other angles.

The angle of the taper face 82c in the tangent direction is designed such that a power load for the separating cam 82 is substantially the same at any of the initial, middle and final stages of separating operation for upward movement of the tray 2 in compressing the coil spring 24 in accordance with the magnitude of a spring force of the applied coil spring 24. Such configuration improves the efficiency of power for driving the separating cam 82.

Next, the third separating control parts 82d, 82d will be described. The third separating control part 82d, 82d comprise upper stage engagements 82j, 82j, middle stage engagements (lowering control part) 82k, 82k, and lower stage engagements 82m, 82m. The upper stage engagements 82j, 82j serve to form spaces above and below the selected tray 2, the middle stage engagements 82k, 82k serve to lower the selected tray 2 and CD together to place the selected CD on a turntable 97 of the lower arm 13, and the lower stage engagements 82m, 82m serve to lower only the selected tray 2 again to separate it from the selected CD.

2) Hold Means

Figure 7:
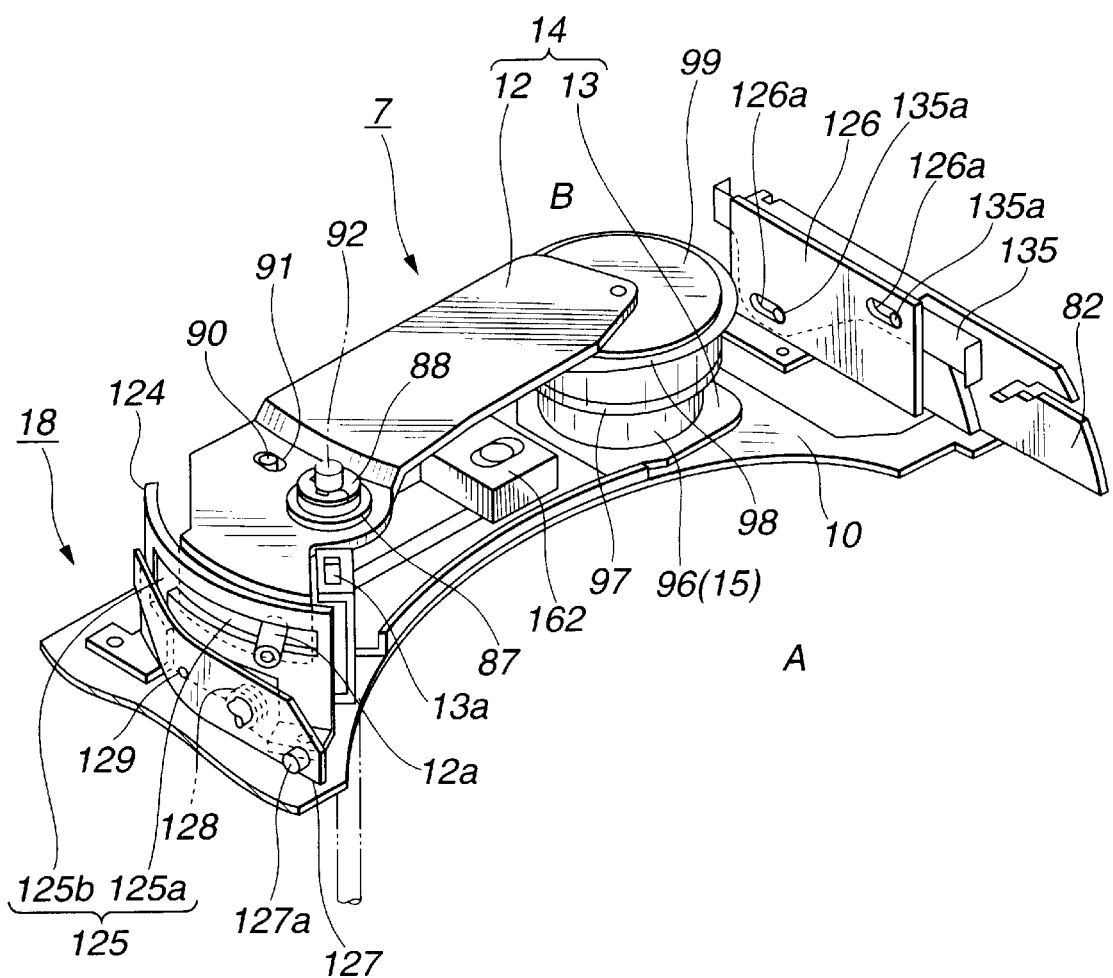
FIG. 7 is a perspective view of reproducing means.
Figure 8:
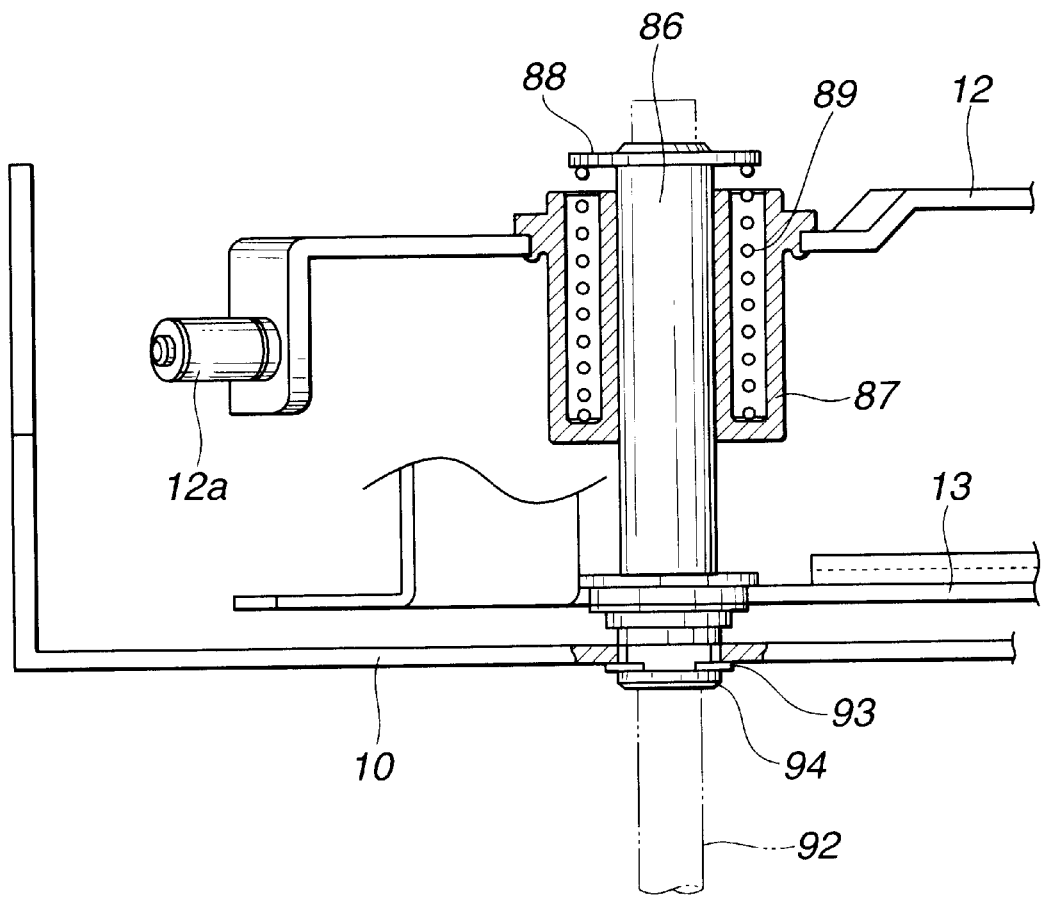
FIG. 8 is a sectional view of the main part of holding means.

The hold means 14 will be described, which are rotated toward the spaces formed by the space forming means 11 above and below the selected CD to hold the selected CD. Base ends of the lower and upper arms 13, 12 are rotatably mounted to the pickup lifting/lowering stage 10 on the left. As shown in FIG. 8, a hollow shaft 86 has a near lower end secured to the lower arm 13, and a lower end rotatably arranged through the pickup lifting/lowering stage 10, with which a flat washer 93 and a retaining ring 94 are engaged for anti-disengagement. A sleeve 87 of copper alloy is fixedly engaged with the base end of the upper arm 12, through which the hollow shaft 86 is arranged so that the upper arm 12 is lowered parallel to the lower arm 13 to hold the selected CD. A flat washer 88 and a retaining ring are engaged with an upper end of the hollow shaft 86. A hold spring 89 is arranged between the flat washer 88 and the sleeve 87 to bias the upper arm 12 downward. As shown in FIG. 7, in order to obtain synchronous unitary rotation of the lower and upper arms 13, 12 about the hollow shaft 86 without any relative rotation, a slide pin 90 is provided on the lower arm 13 and slidably arranged through a hole 91 formed in the upper arm 12. In order to improve the positioning accuracy of the turntable 97 as describe later on the lower arm 13 with respect to CD upon rotation of the hold means 14, a support 92 is provided on the bottom plate 1e and arranged through the hollow shaft 86 on the pickup lifting/lowering stage 10.

3) Disc Driving Means

Figure 34:
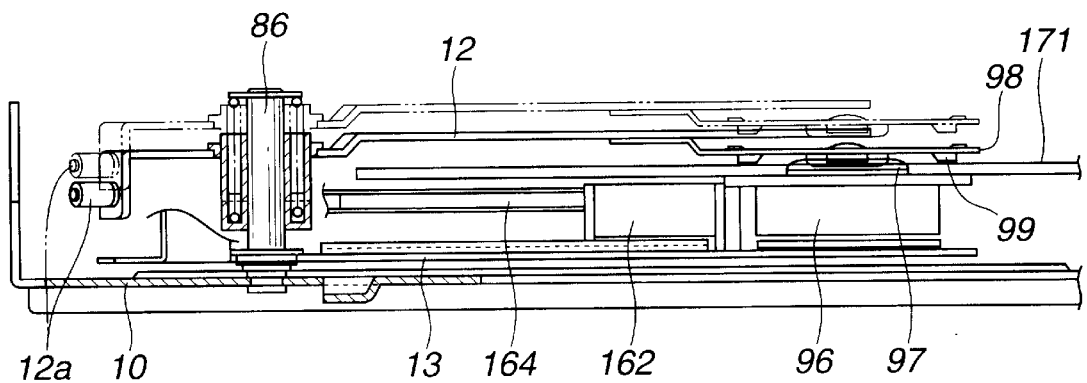
FIG. 34 is an operation explaining view showing the state where the hold means hold CD due to blocking released by the restriction means.

The disc driving means 15 are arranged on the top face of a head of the lower arm 13. As shown in FIG. 7, the spindle motor (disc driving means) 15 is mounted, having an output shaft to which the turntable (rotation support means) 97 is mounted to engage with a center hole of CD. On the other hand, as shown in FIG. 34, a support plate 98 has one end secured to a head of the upper arm 12 in the vicinity thereof, and another end formed with a circular hole. A chuck plate (disc holding means) 99 made of resin and having a rib-like protrusion formed circularly on the lower face of a disc is rotatably engaged with the hole from above. Antdisengagement of the chuck plate 99 is ensured by another end of a spring plate, not shown, having one end secured to the lower face of the upper arm 12. CD is held by the turntable 97 and the chuck plate 99.

4) Pickup Unit

Figure 9:
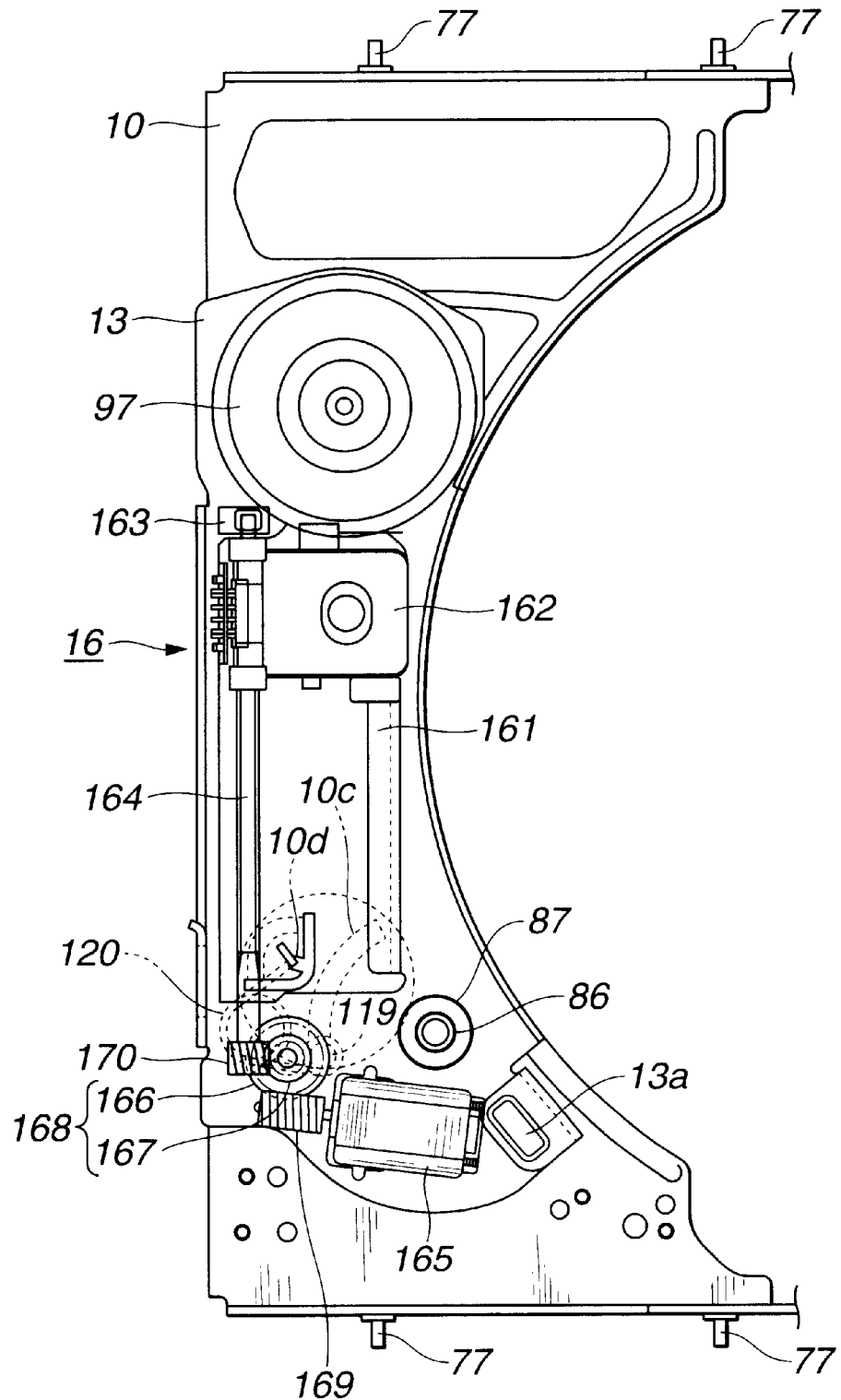
FIG. 9 is a front view of a pickup unit.

As shown in FIG. 9, the pickup unit 16 is also mounted on the top face of the lower arm 13. The configuration of the pickup unit 16 will be described. An optical pickup 162 is arranged to be movable along the longitudinal direction of the lower arm 13 through a guide rail 161 integrated with the lower arm 13. Also arranged are means for reciprocating the optical pickup 162 along the guide rail 161. A threaded shaft 164 is rotatably supported on the top face of the lower arm 13 through a pair of bearing members 163, with which a female thread portion, not shown, of the optical pickup 162 is meshed. An output shaft of a scanning motor 165 arranged in the vicinity of the sleeve 87 is coupled with the threaded shaft 164. A gear 168 having a worm wheel 166 and a crossed helical gear 167 integrated with each other is supported rotatably, wherein the worm wheel 166 is meshed with a worm of the output shaft of the motor 165, and the crossed helical gear 167 is meshed with a crossed helical gear 170 mounted to the threaded shaft 164.

5) Torque Providing Means

The torque providing means 17 rotate the hold means 14 by torque from the transfer motor 46. As show in FIG. 6, a gear train 103 is arranged inside the left side plate 1b of the casing 1. Specifically, the gear train 103 comprises gears 103a–103h. A gear 104 is also secured to a left end of the drive shaft 30. A plate 105 is vertically movably arranged inside the left side plate 1b. Specifically, a vertically extending guide slot 105a is formed in an upper portion of the plate 105, through which a guide pin 106 (see FIG. 28) is arranged. The guide pin 106 is secured to the left side plate 1b, and has a retaining ring mounted thereto. Spring engagements 105b, 107 are formed with a lower portion of the plate 105 and the bottom plate 1e of the casing 1e, and a return spring 108 is arranged between the two for biasing the plate 105 downward. An escape hole 105c is formed in the plate 105 to receive a shaft 109 (secured to the side plate 1b) of the gear 103h. A base end of a lever 110 is rotatably mounted to the shaft 109. A shift shaft 111 is arranged through the lever 110 and secured to a head of the shaft 109. A gear 112 is rotatably mounted to the shift shaft 111 and meshed with the gear 103h. A cam hole 105d is formed in the plate 105 above the escape hole 105c, through which an end of the shift shaft 111 is arranged. Specifically, when moving the plate 105 upward, the cam hole 105d is moved upward, and the shift shaft 111 arranged through the cam hole 105d is moved forward, thereby also obtaining mesh of the gear 112 mounted to the shift shaft 111 with the gear 104 of the drive shaft 30. In order to move the plate 105 upward, a middle portion of the lever 113 is rotatably supported by the inside of the left side plate 1b through a pin 114, and one end of the lever 113 is rotatably connected to a lower portion of the plate 105 through a pin 115. Another end of the lever 113 faces a lower portion of the front one of the guide holes 25 of the left side plate 1b through which the pin 22b of the disc lifting/lowering stage 22 is arranged. That is, when the disc lifting/lowering stage 22 is in the lowermost position to enter the reproducing mode, the pin 22b pushes another end of the lever 113 downward to mesh the gear 112 with the gear 104.

Then, the uppermost gear 103a of the gear train 103 is coupled with the lower arm 13 of the hold means 14 as follows. As shown in FIG. 2, a slide bar 116 is arranged which comprises a longitudinally lengthened vertical part and a horizontal part integrated with the vertical part in the rear portion. A pair of guide slots 116a is formed in the slide bar 116 in the vicinity of both sides of the vertical part, and, as shown in FIG. 5, a pair of guide pins 117 is arranged through the pair of guide slots 116a and secured to the inside of the left side plate 1b, each having a retaining ring mounted thereto. In the way as described above, a rack 116b is formed with a lower front portion of the longitudinally slidably slide bar 116 to mesh with the gear 103a, whereas an engagement pin 116c protruding downward has an upper end secured to a head of the rear portion of the horizontal part. As shown in FIG. 7, the engagement pin 116c is integrated with a base end of the lower arm 13, and is movably engaged with a slot 13a formed in the horizontal part and extending to the level of the upper arm 12. As shown in FIG. 9, the slot 13a is formed to extend along a radial straight line passing through the axis of the sleeve 87 and orthogonal to the sleeve 87.

Figure 30:
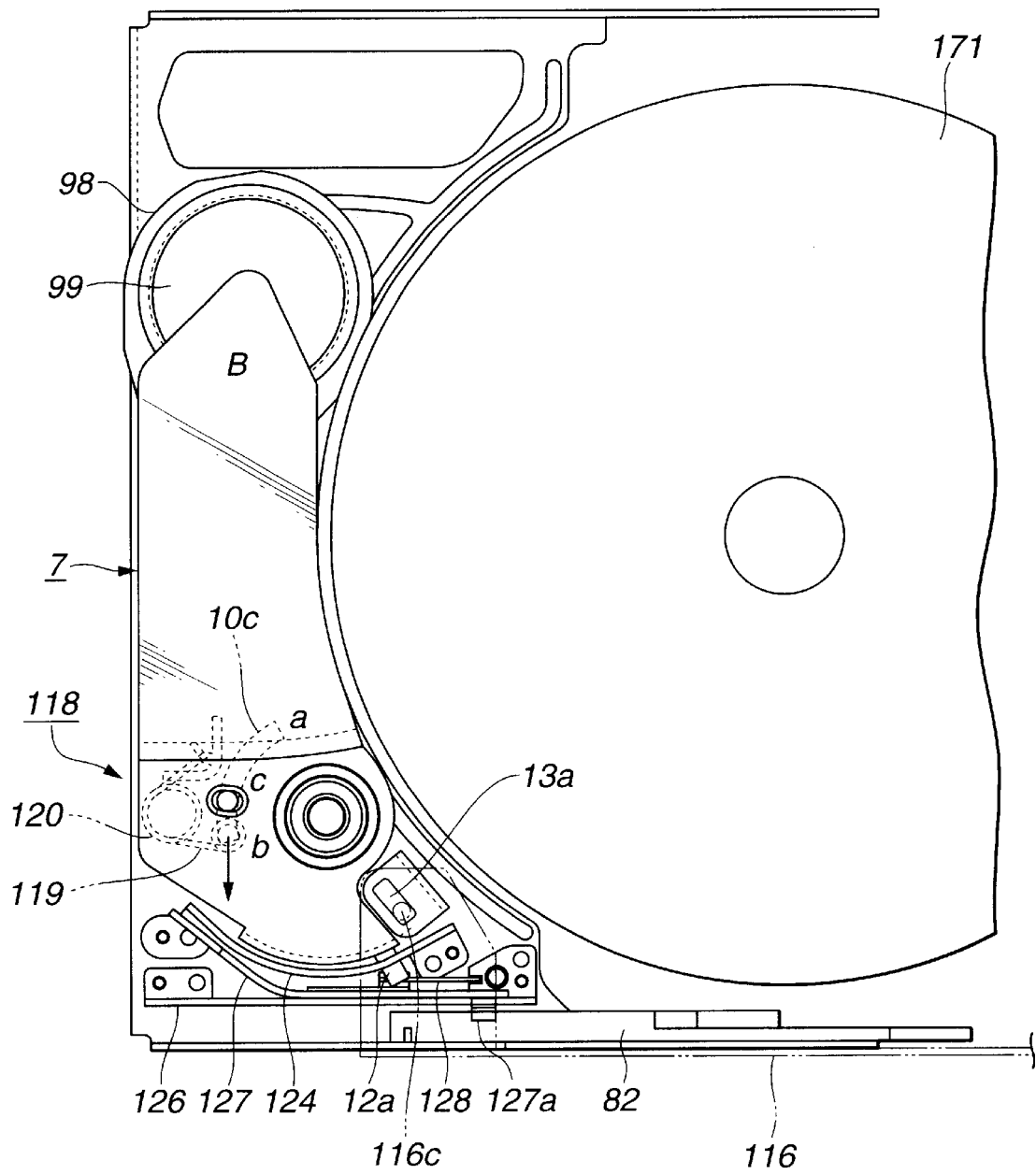
FIG. 30 is an operation explaining view showing the state where the hold means occupy the standby position.
Figure 31:
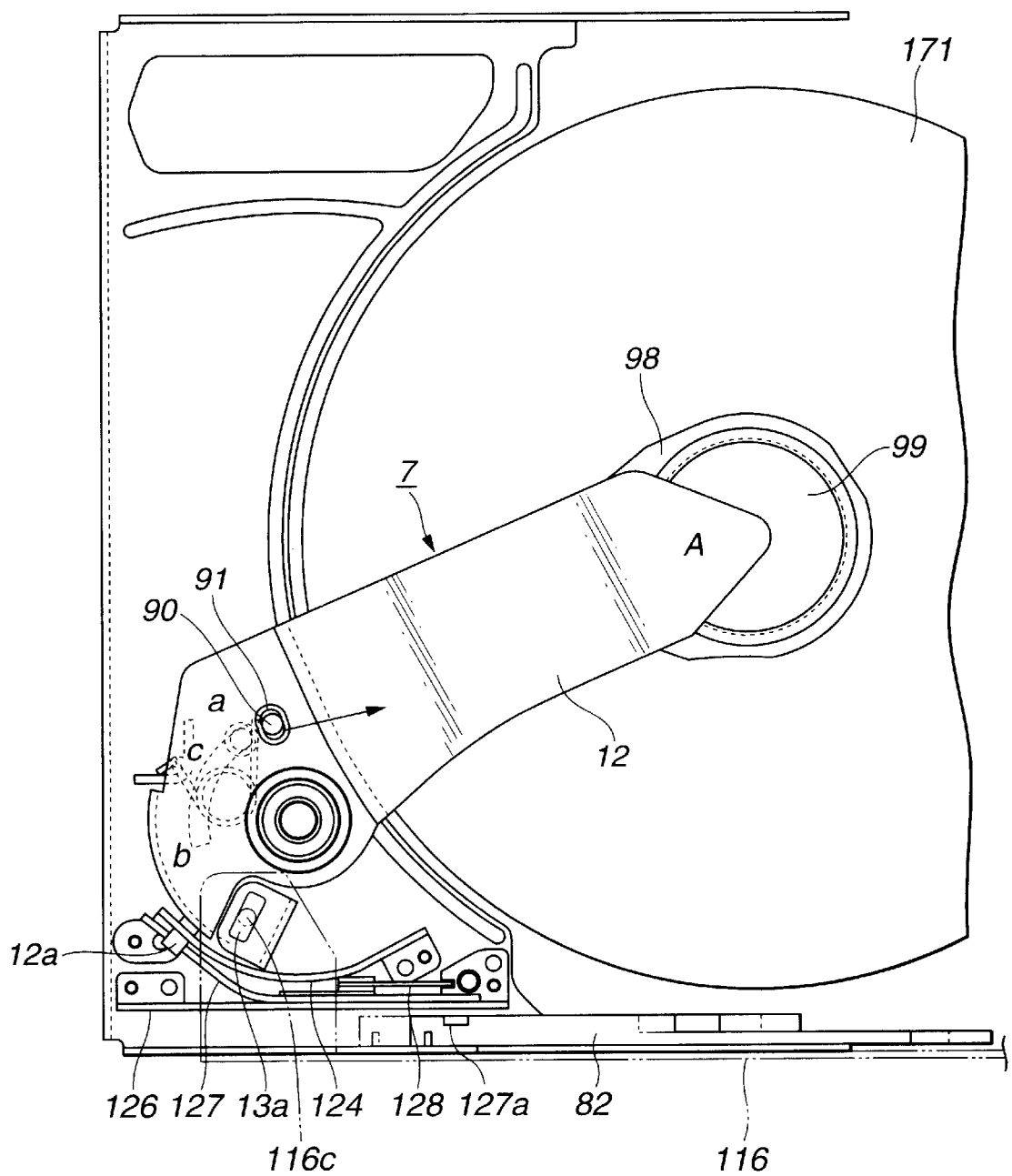
FIG. 31 is an operation explaining view showing the state where the hold means occupy the reproduction position.

The disc player has two modes, i.e. loading/unloading mode wherein CD is loaded and ejected from the disc compartment 3 and reproducing mode wherein CD is reproduced. In the former case, the hold means 14 occupy a position (B) as shown in FIG. 30, whereas in the latter case, the hold means occupy a position (A) as shown in FIG. 31. Rotation of the hold means 14 between the position (B) and the position (A) is carried out through the torque providing means 17 as described above. However, due to need of accurate positioning of the selected CD with respect to the turntable 97 on the lower arm 13, there are arranged positioning means 118 of FIG. 10.

The configuration of the positioning means 118 will be described. As shown in FIGS. 9–10, a positioning pin 119 protruding downward has an upper end secured to the lower arm 13 in the vicinity of the hollow shaft 86. A circular hole 10c is formed in the pickup lifting/lowering stage 10 in a portion corresponding to the range that the positioning pin 119 moves in accordance with rotation of the hold means 14. The positioning pin 119 is loosely engaged with the circular hole 10c. A spring engagement 10d is formed with the pickup lifting/lowering stage 10 to protrude downward. Both ends of a toggle spring 120 are engaged with the positioning pin 119 and the spring engagement 10d. Assuming that the positioning pin 119 are in positions b, a when the hold means 14 occupy the position (B), (A), a position c that is a midpoint between the position b and the position a corresponds to a point of inflection where the moving direction of the positioning pin 119 is changed, so that the spring engagement 10d is placed in a position corresponding to the position c.

6) Restriction Means

Figure 33:
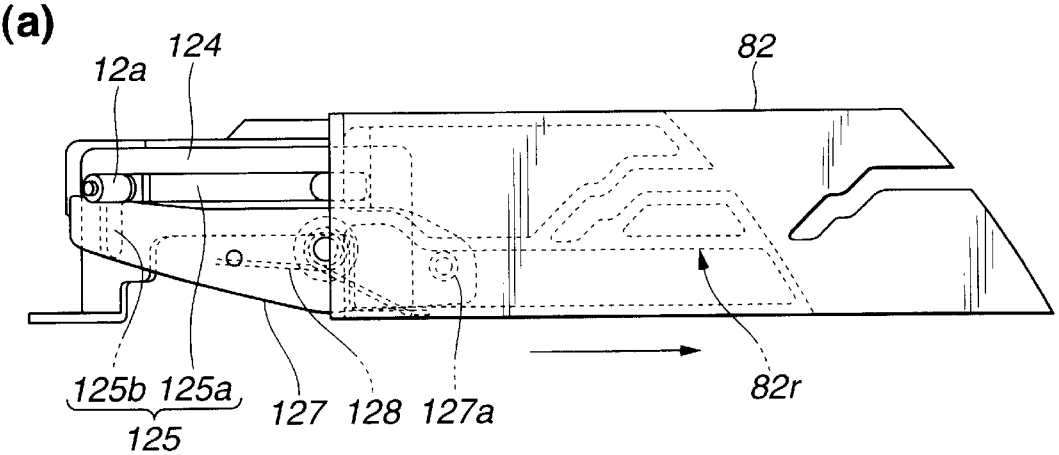
FIG. 33 show restriction means when the hold means occupy the reproduction position, wherein (a) is an operation explaining view showing the state where holding is blocked, and (b) is an operation explaining view showing the state where blocking is released.

The upper arm 12 of the hold means 14 is biased downward by the hold spring 89, and includes restriction means 18 for setting a timing for lowering the upper arm 12 by a biasing force of the hold spring 89 as shown in FIG. 7. The restriction means 18 are configured as follows:

A cylindrical plate 124 is erectly arranged on the top face of the pickup lifting/lowering stage 10 and between the hold means 14 and the separating cam 82. The cylindrical plate 124 forms a partial cylinder including part of a cylinder with center at the sleeve 87, and has an L-shaped guide slot 125 comprising a horizontal part 125a extending circumferentially and a vertical part 125b extending axially as shown in FIGS. 32–33. A guide pin 12a is secured to the base end of the upper arm 12 to protrude outward in the radial direction of the sleeve 87. The guide pin 12a is arranged through the guide slot 125. As a result, in FIG. 7, when the hold means 14 occupy the position (B) or standby position and immediately before the hold means moved from the position (B) occupy the position (A) or reproduction position, the guide pin 12a is positioned in the horizontal part 125a of the guide slot 125. Thus, even with a biasing force of the hold spring 89 being applied, the upper arm 12 is not lowered to allow the hold means 14 to be open. On the other hand, when the hold means 14 are in the position (A), the guide pin 12a is positioned in the vertical part 125b, so that the upper arm 12 is lowered by a biasing force of the hold spring 89 to lower the guide pin 12a to a lower end of the vertical part 125b.

In order that the hold means 14 may not start hold operation as soon as the hold means 14 are rotated to the position (A) as shown in FIG. 7 to rotate the guide pin 12a to the vertical part 125b of the guide slot 125, but may start hold operation only after receiving a command, there are arranged first restriction means for temporarily restricting downward movement of the guide pin 12a, and second restriction means for releasing temporary restriction to hold the selected CD when forward movement of the separating cam 82 after temporary restriction causes the selected CD and tray 2 to be lowered and placed on the turntable 97. Specifically, the configuration is as follows. A bearing plate 26 is erectly arranged on the top face of the pickup lifting/lowering stage 10 and between the cylindrical plate 124 and the separating cam 82 to be parallel to the separating cam 82 as shown in FIGS. 7 and 30. As shown in FIG. 7, a middle portion of a restraining lever 127 is rotatably supported by the inside of the bearing plate 126 through a rotation shaft 129, and a pin 127a is secured to the restraining lever 127 in the front portion to protrude outward. A rear portion of the restraining lever 127 is bent inward to face the vertical part 125b of the guide slot 125. As shown in FIG. 30, a spring 128 is arranged to bias the rear portion of the restraining lever 127 downward. The pin 127a in the front portion of the restraining lever 127 is loosely engaged with a cam groove 82r formed in the lower inside of the separating cam 82 as shown in FIG. 32. An escape is formed in an upper rear portion of the cam groove 82r. When the separating cam 82 is moved forward to engage the pins 2c, 2d of the selected tray 2 with the middle stage engagements 82k, 82k, the pin 127a can escape into the escape of the cam groove 82r. Then, the restraining lever 127 is rotated by the spring 128, and the upper arm 12 is lowered by a biasing force of the hold spring 89.

(G) Push Means

The push means 8 are arranged inside the casing 1 on both sides thereof. Since the two push means 8 are substantially the same in configuration, one of which will be described. As show in FIGS. 1 and 19, a push lever 132 for pushing CD is rotatably mounted to a stationary shaft 133 that protrudes downward from the top plate 1d of the casing 1. The push lever 132 is at the same level as that of the boundary between the rollers 35, 36. A return spring 134 is arranged to enclose the stationary shaft 133, and has both ends engaged with a spring engagement 132a of the push lever 132 and a spring engagement of the top plate 1d. The push lever 132 is rotated by backward movement of the separating cam 82 as described above, which is the direction opposite to that for space formation by forward movement thereof. Specifically, the configuration is as follows. As shown in FIG. 7, a plate (second engagement) 135 is arranged outside the bearing plate 126 to be slidable longitudinally by a predetermined amount. That is, a pair of guide slots 126a is formed in the bearing plate 126, and a pair of guide pins 135a is arranged through the pair of guide slots 126a and secured to the plate 135. The plate 135 has a front side end bent inward to be engageable with a pressed portion 132b integrated with the push lever 132, and a rear side end bent outward to protrude behind the separating cam 82.

(H) Operation Means

Finally, the operation means 9 will be described. In the loading/unloading mode, the operation means 9 lift and lower the disc lifting/lowering stage 22 to allow loading and unloading of CD on the tray 2 and also operate the opening/closing means 6 and the push means 8. In the reproducing mode, the operation means 9 lift and lower the pickup lifting/lowering stage 10 to take the selected CD with the disc lifting/lowering stage 22 maintained in the lowermost position, and also operate the space defining means 11 and the restriction means 18.

As shown in FIGS. 2 and 11, an inner slide 139 and an outer slider (startup plate) 140 is longitudinally slidably arranged outside the left and right side plates 1b, 1c of the casing 1. Since the two are symmetrical, one of which will be described. Guide slots 139a, 140a are formed in the sliders 139, 140 in the upper and lower portions. Guide pins 158, 159 are arranged through the guide slots 139a, 140a and secure to the side plate, and have retaining rings mounted thereto. A pair of stepped slits 141 is formed in the inner slider 139 in the rear portion to lift and lower in a six-step way the pair of pins 77 of the pickup lifting/lowering stage 10 protruding from the vertical slit 78. A pair of stepped slits 142 is formed in the inner slider 139 in the front portion to lift and lower in a six-step way the pair of pins 22b of the disc lifting/lowering stage 22 protruding from the vertical slit 25. A bottom slit 143 is continuously formed below each stepped slit 142 to lift and lower only the pickup lifting/lowering stage 10 in the reproducing mode with the disc lifting/lowering stage 22 maintained in the lowermost position. On the other hand, only a pair of slits for receiving the pair of long pins 22b of the disc lifting/lowering stage 22 is formed in the outer slider 140. Specifically, formed in a communicating way are a square loading/unloading-mode slit 144 for moving upward and downward the pin 22b received in the stepped slit 142, a horizontally extending reproducing-mode slit 145 for holding in the lowermost position the pin 22b received in the bottom slit 143, and a 45° inclined switching slit 146 for switching the position of the pin 22b between the stepped slit 142 and the bottom slit 143 by moving the pin 22b upward or downward through taper faces 146a, 146b by slide operation of the outer slider 140 in any direction. If the reproducing-mode slits 145 are formed in the same vertical position, they are superimposed one upon another. Thus, the reproducing-mode slits 145, the loading/unloading-mode slits 144, the bottom slits 143, the stepped slits 142, and the pins 22b inserted therein are positioned at different levels.

An upper portion of the outer slider 140 is bent inward orthogonally to form a protrusion (first or second engagement) 140b. In order to allow movement of the protrusion 140b together with the outer slider 140, an escape recess 139b and an escape slit 147 are formed in the inner slider 139 and the side plate 1b in rear portions thereof, respectively. In order that the separating cam (first or second engagement) 82 may slide together with the outer slider 140 regardless of the level position of the separating cam 82 that lifts and lowers with the pickup lifting/lowering stage 10, a vertical engagement groove 82s is formed in the rear outside of the separating cam 82 as shown in FIG. 2, with which the protrusion 140b is engaged slidably. An engagement (second engagement) 140c is formed with the left outer slider 140 in the front portion to extend below the bottom plate 1e of the casing 1. When the outer slider 140 is slid backward, the engagement 140c presses the pressed portion 70c backward to open the shutter 64 against a biasing force of the return spring 69.

Next, a drive mechanism will be described, which serves to simultaneously synchronously slide the right and left ones of the inner and outer sliders 139, 140. As shown in FIGS. 2 and 6, two connecting shafts 148, 149 are rotatably supported below the bottom plate 1e of the casing 1 in the rear portion through two pairs of bearings. Pinions 150, 151 are secured to both ends of the connecting shafts 148, 149, and are meshed with racks 139c, 140c formed with the inner and outer sliders 139, 140 on the rear lower faces. Gears 152, 153 are secured to the connecting shafts 148, 149, and are individually coupled with operating motors 154, 155. Specifically, the configuration is as follows. The operating motors 155, 154 are mounted to upper and lower inside portions of the bearing plate 126 disposed in the right rear portion of the casing 1, and have output shafts coupled with the gears 152, 153 through two sets of reduction means 156, 157 arranged inside the bearing plate 126.

Here, the first engagement comprises protrusion 140b and separating cam 82, and the second engagement comprises, in addition to those, plate 135 and engagement 140c.

Next, operation of such disc player will be described.

(I) General Outline of Operation

Operation of the disc player is composed of three functions: loading of CDs into the disc compartment 3, ejection of CDs from the disc compartment 3, and selection and reproduction of one of CDs stored in the disc compartment 3.

(J) CD Loading

When loading CD into the disc compartment 3, the number assigned to the tray 2 is selected to push a number button, not shown, of, e.g. "2" before pushing a loading button, not shown. Here, the numbers 1–6 are assigned to the trays 2 from top to bottom. Rotation of an output shaft of the operating motor 154 is transmitted to the reduction means 156 and the connecting shaft 148 to slide the inner sliders 139. Independently, rotation of an output shaft of the operating motor 155 is transmitted to the reduction means 157 and the connecting shaft 149 to slide the outer sliders 140. When pushing the button with the pins 22b entering the loading/unloading slits 144 of the outer slider 140 as shown in FIG. 12, for example, to be in the mode switching position in the loading/unloading mode, backward movement of the inner slider 139 raises the pins 22b to the bottom but one step of the stepped slits 142 as shown in FIG. 13(a). With this, the disc lifting/lowering stage 22 is raised to set CD on the top but one tray 2 at the level of the push lever 132. At that time, the pickup lifting/lowering state 10 is raised simultaneously. Further backward movement of the inner slider 139 raises the pickup lifting/lowering stage 10 together with the pins 22b to have the third to sixth trays 2 at the level of the push lever 132 successively.

Then, when the outer slider 140 is moved backward from the standby position as shown in FIG. 13(a) to have the pins 22b in the longitudinal middle position of the loading/unloading-mode slits 144, the engagement 140c of the outer slider 140 presses backward the pressed portion 70c shown in FIG. 2) below the bottom plate 1e. Thus, movement of the longitudinally slide plate 70 is transmitted, through the lever 72, to the laterally slide plate 66 which is moved leftward against a biasing force of the return spring 69, raising the shutter 64 to open the loading/unloading opening 4 as shown in FIG. 17(b).

Figure 18:
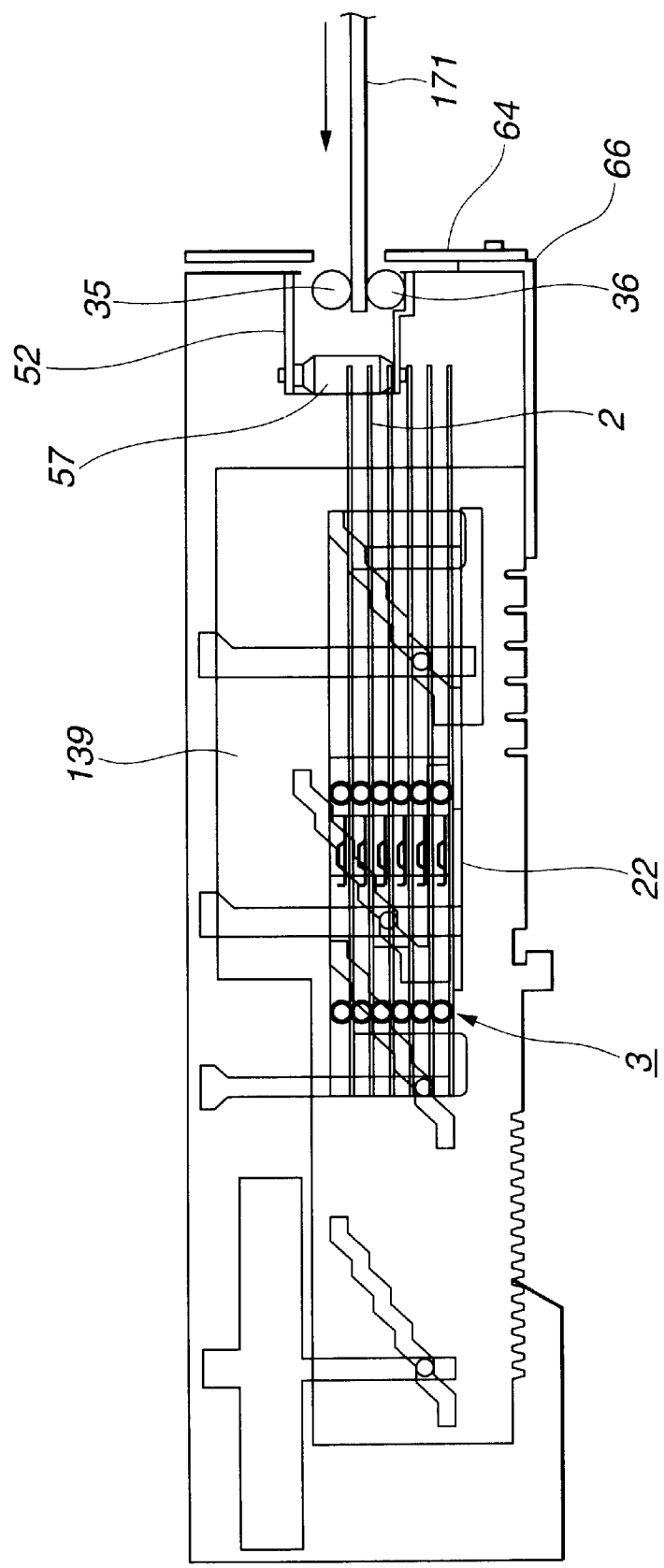
FIG. 18 is a lateral sectional view of the disc player upon CD loading.

By the above action, the shutter 64 is opened, and the top but one tray 2 is at the same level of the push lever 132 as described above, so that when inserting a CD 171 between the rollers 35, 36 as shown in FIG. 17(a), a sensor, not shown, disposed in the center of the front of the shutter 64 senses the CD 171 to rotate the transfer motor 46. Since torque from the transfer motor 46 is transmitted to the roller 36 through the gears, the CD 171 is bitten between the roller 36 and the roller 35 biased thereto by the spring 38 as shown in FIG. 18, and is loaded onto the top but one tray 2 by rotation of the rollers 35, 36. As being not fully inserted by the rollers 35, 36, the CD 171 is pushed by last several millimeters in the center direction by the vertical rollers 57 biased by the push spring 60. The CD 171 is held on the tray 2 by the pressers 2f of the pair of plate springs 2e. When the CD 171 separates from the rollers 35, 36, a limit switch, not shown, operates to stop rotation of the transfer motor 46, which causes simultaneously the outer sliders 140 to move forward and return to the standby position as shown in FIG. 13(a). Thus, the pressed portion 70c that has been pressed backward is released to close the shutter 64 through operation of the return spring 69.

Likewise, when the pins 22b are in any other position, i.e. one of the first and third to sixth step of the stepped slit 142 from below, CD can be loaded in the disc compartment 3 in the same way.

(K) CD Ejection

When ejecting CD from the disc compartment 3, the number button of, e.g. "2", is pushed together with an unloading button. Then, in the same way as upon loading, the pins 22b are moved from the mode switching position in the loading/unloading mode as shown in FIG. 12 to the standby position as shown in FIG. 13(a) so as to set CD on the top but one tray 2 at the level of the push lever 132. And when the outer slider 140 (corresponding to the second position) is moved backward to the position as shown in FIG. 13(b) in the same way as described above, the shutter 64 is opened. Operation up to here is quite the same as that upon CD loading.

Figure 14:
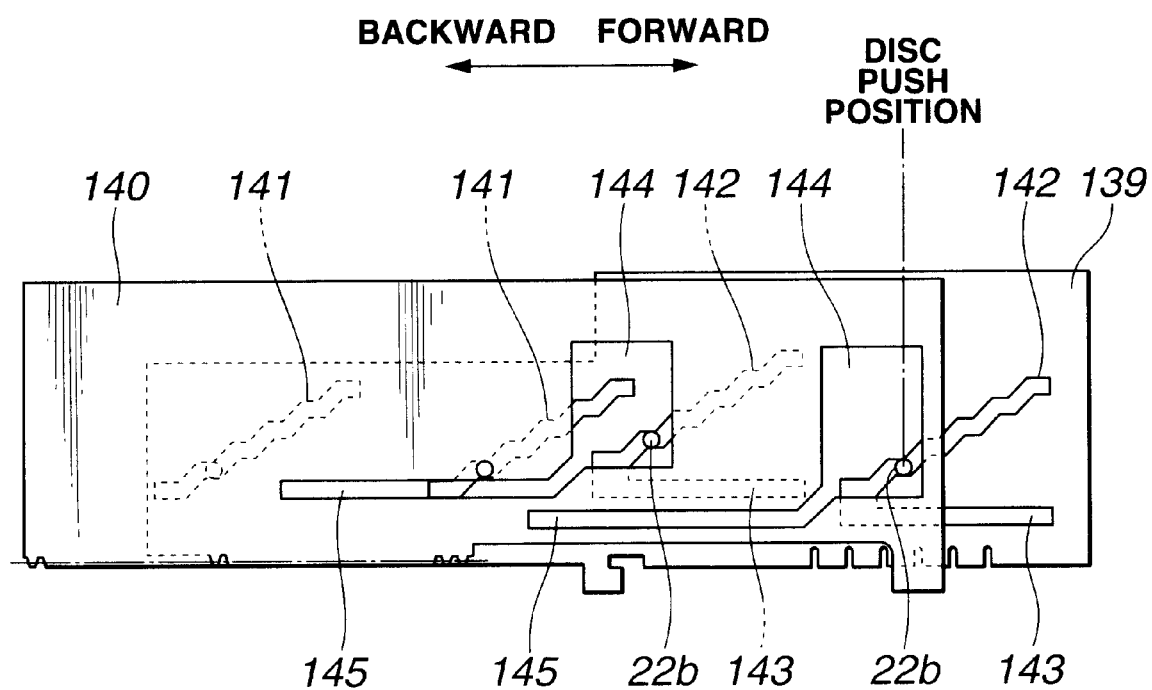
FIG. 14 is an operation explaining view of the operating means with a push lever rotated, when the top but one CD is ejected.
Figure 20:
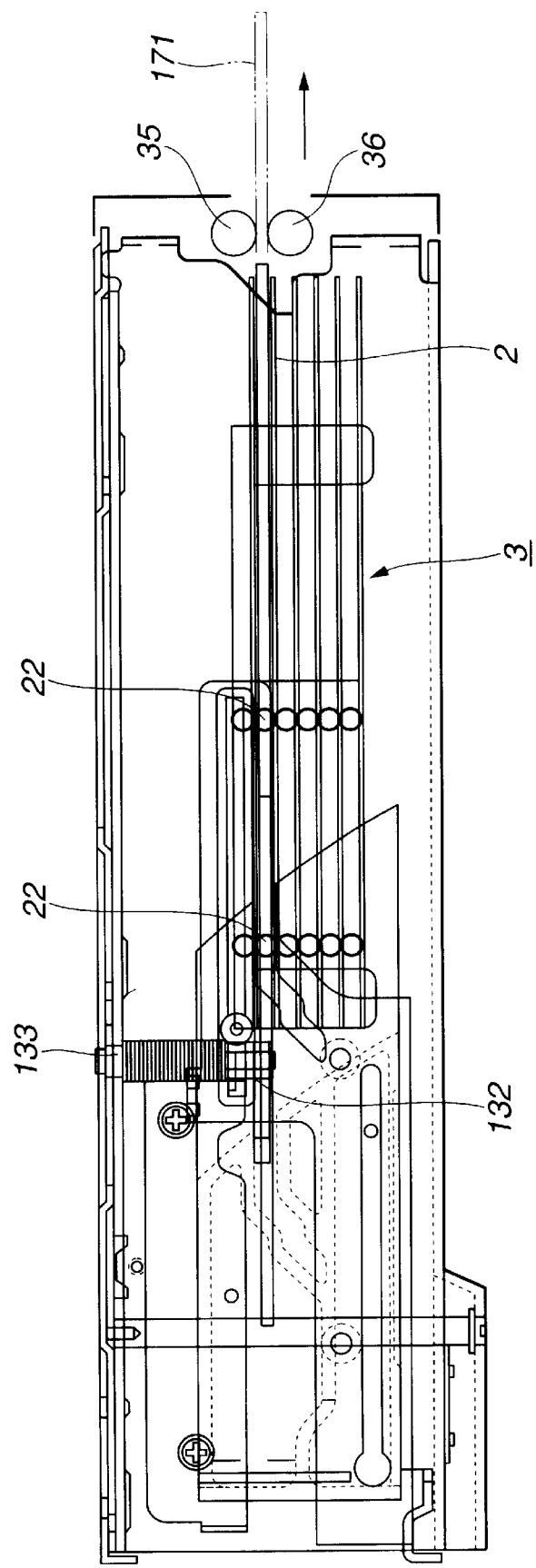
FIG. 20 is a lateral sectional view of the push means upon CD ejection.

Then, when the outer slider 140 (corresponding to the second position) is moved backward further until the pins 22b become in the front of the loading/unloading-mode slits 144 as shown in FIG. 14, the separating cam 82 operating with the outer slider 140 through the rear protrusion (first engagement) 140b of the outer slider 140 is moved backward as shown in FIG. 19 so that the rear face of the separating cam 82 presses the rear face of the plate (second engagement) 135 for backward movement. Then, the front face of the plate 135 presses the pressed portion 132b of the push lever 132 backward to rotate the push lever 132 so as to push both sides of the CD 171 on the second tray 2. Since the transfer motor 46 is driven to rotate the rollers 35, 36 at the instant when pushing the unloading button, the pushed CD 171 is ejected in being held between the rollers 35, 36 as shown in FIG. 20. In order to prevent the CD 171 from falling upon unloading, a limit switch, not shown, detects the CD 171 when the rear portion is partly held between the rollers 35, 36 to stop rotation of the transfer motor 46. After this, the CD 171 is removed manually between the rollers 35, 36. When a sensor, not shown, senses a removal of the CD 171, the outer sliders 149 are moved forward to return the pins 22b from the position as shown in FIG. 14 to the standby position as shown in FIG. 13(a).

Then, due to elimination of a backward force applied to the plate 135 from the separating cam 82, the push lever 132 is rotated by a biasing force of the return spring 134 to return to an initial position as indicated by the fully drawn line in FIG. 19(a), then the shutter 64 is closed in the same way as after CD loading.

When the pair of pins 22b occupies any other level position (one of the first and third to sixth step of the stepped slit 142 from below), CD can be ejected from the disc compartment 3 in the same way.

(L) CD Reproduction

When reproducing CD, the number button of, e.g. "2", of the selected CD is pushed together with a reproduction button. Then, the inner slider 139 is moved forward from the position as shown in FIG. 13(a) to lower the pins 22b to the mode switching position via the lowermost position of the loading/unloading-mode slits 144 as shown in FIG. 12 before the outer slider 140 is moved forward. Then, the upper taper faces 146b of the switching slits 146 as shown in FIG. 11(c) are pressed to lower the pins 22b. As soon as the pins 22b are moved to the bottom slits 143, they are moved into the reproducing-mode slits 145 of the outer slider 140 to achieve switching to the reproducing mode as shown in FIG. 15(a). Upon switching, the pins 77 of the pickup lifting/lowering stage 10 remain in the lowermost position of the stepped slits 141. At that time, the pins 22b are positioned in the switching position from the reproducing mode to the loading/unloading mode. In this state, when moving the outer sliders 140 backward, the lower taper faces 146a of the switching slits 146 are pressed to raise the pins 22b which can thus return to the mode switching position in the loading/unloading mode as shown in FIG. 12.

The position of the pins 22b with respect to the outer sliders 140 as shown in FIG. 15(a) corresponds not only to the mode switching position, but the CD selecting position where CD to be reproduced is selected by changing only the level of the pickup lifting/lowering stage 10. Specifically, if only the inner sliders 139 are moved backward from the position as shown in FIG. 15(a), the pair of pins 22b is apparently moved forward along the bottom slits 143, but is actually held in the lowermost position of the vertical slits 25, obtaining no movement of the disc lifting/lowering stage 22 from the lowermost reproduction position. On the other hand, the other pair of pins 77, not seen due to presence of the outer sliders 140, is apparently relatively lifted along the stepped slits 141, but is actually lifted stepwise along the vertical slits 78. That is, when the pair of pins 22b is positioned in the position of any of the numbers 1–6 assigned to the bottom slits 143 by moving the inner sliders 139 backward, the pins 77 are lifted or lowered at the level of the corresponding one of the number 1–6 assigned vertically to the stepped slits 142, allowing reproduction of CD of the corresponding number. FIG. 15(a) illustrates the state where No. 6 CD can be reproduced, and FIG. 15(b) illustrates the state where No. 1 CD can be reproduced.

Here, No. 2 CD is selected as described above, so that the pins 77 are lifted to the top but one position as shown in FIG. 16(a). The above operation allows CD reproduction. Subsequent operation is the same with CD of any number selected, and is ensured by movement of the outer sliders 140 and driving of the transfer motor 46.

Figure 22:
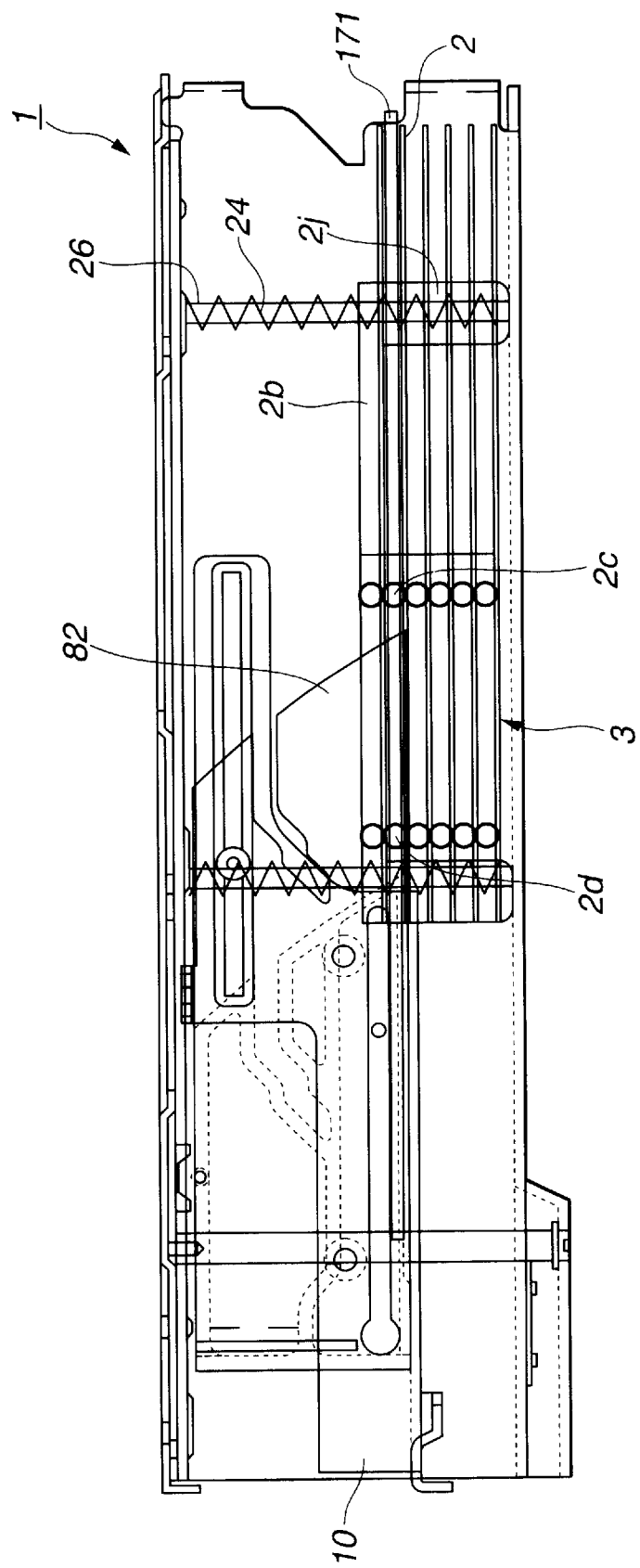
FIG. 22 is a side view showing the state before the separating cam starts separation of the trays.
Figure 23:
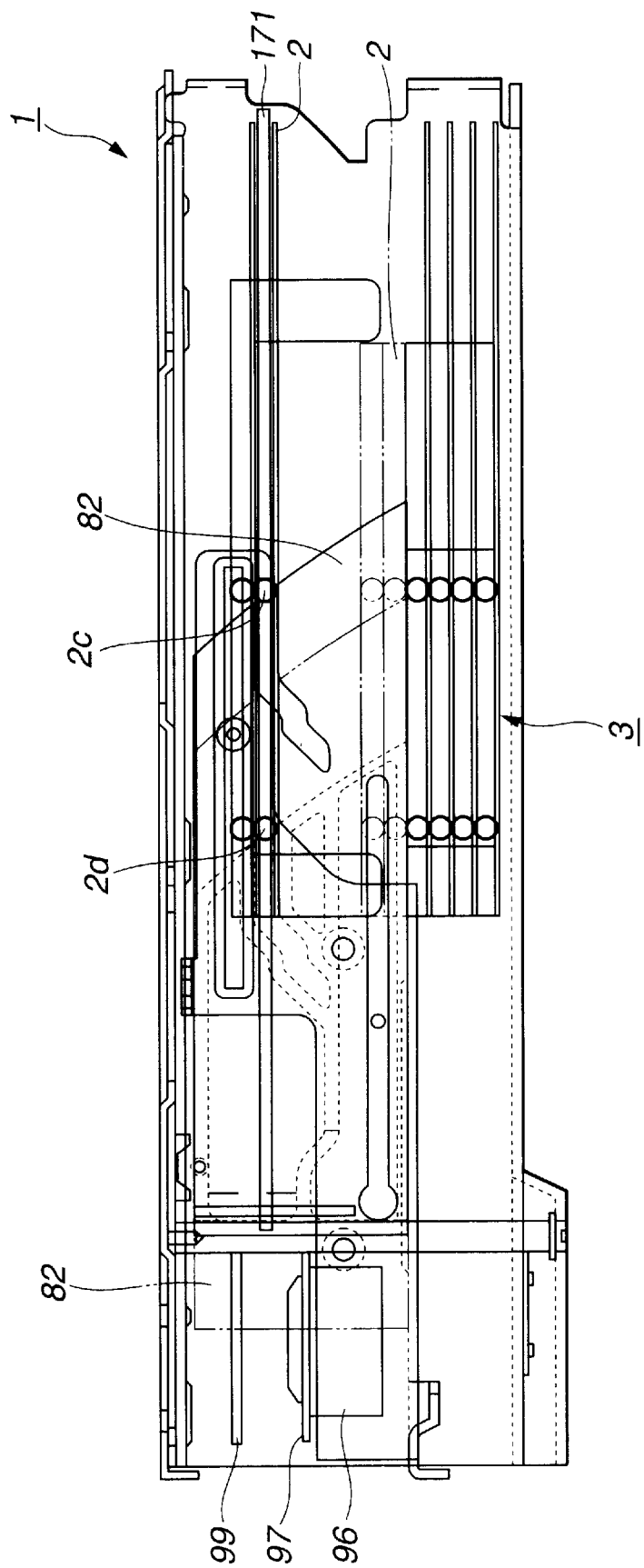
FIG. 23 is a side view showing the state where the trays are separated into two parts by the separating cam.
Figure 24:
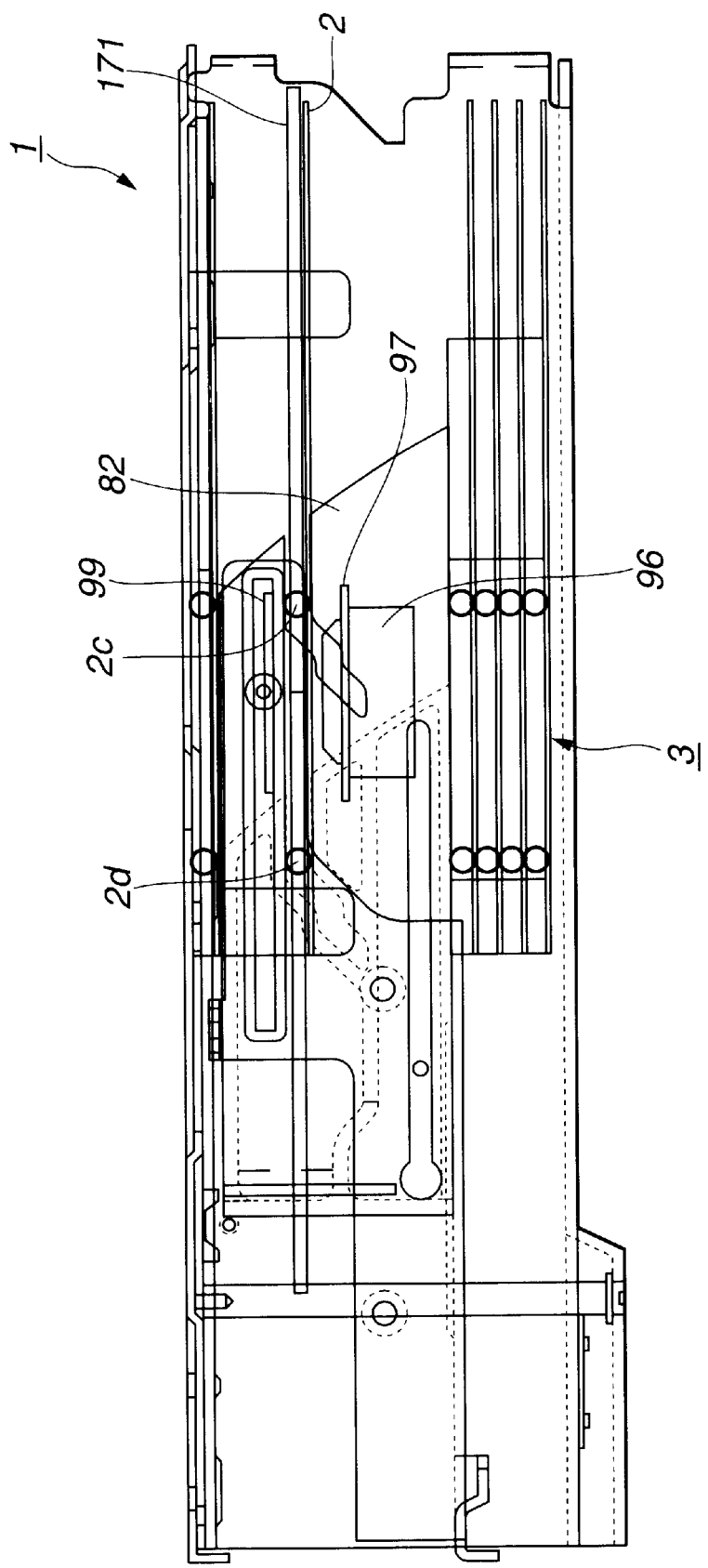
FIG. 24 is a side view showing the state where the trays are separated into three parts by the separating cam.

Operation will be described after the standby state as shown in FIG. 16(a) where No. 2 CD is selected for reproduction. The standby state refers to the state when the pin 22b occupies a position (D) on the outer slider 140 as shown in FIG. 16(b), i.e. the state as shown in FIG. 16(a), wherein the separating cam 82 is positioned as shown in FIG. 22. When the outer slider 140 is moved forward to bring the pin 22b to a position (E) as the first step, the separating cam 82 is moved forward to have the lower rear head introduced between the pins 2d of the top but one and top but two trays 2 as shown in FIG. 21(a) (and also the lower front head introduced between the pins 2c for the same subsequent operation as that of the pins 2d). When the pin 22b is in a position (F) as the second step, the pin 2d of the top but one tray 2 is slid along the first separating control part $82c_1$ to be on the upper stage engagement 82j, and the upper head of the separating cam 82 is introduced between the pins 2d of the topmost and top but one trays 2, falling in the state as shown in FIG. 23. When the pin 22b is in a position (G) as the third step, the pin 2d of the first tray 2 is slid along the second separating control part $82c_2$ to be on the top face 82f of the separating cam 82. As a result, when pin 22b is in the position (G) as the third step, spaces are formed above and below the selected second tray 2 as shown in FIG. 24.

Figure 37:
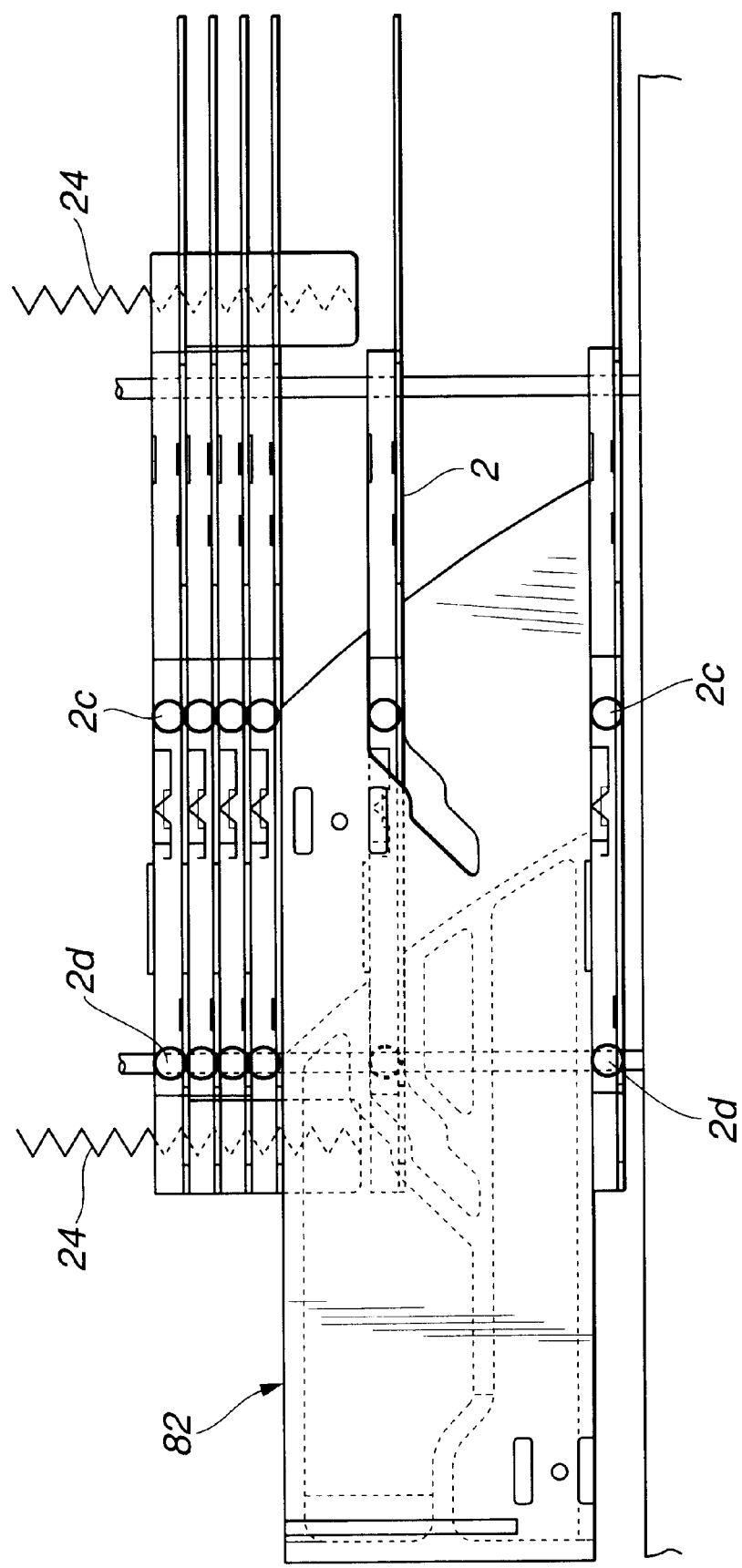
FIG. 37 is a side view showing the state where the trays are separated into three parts by the separating cam.
Figure 38:
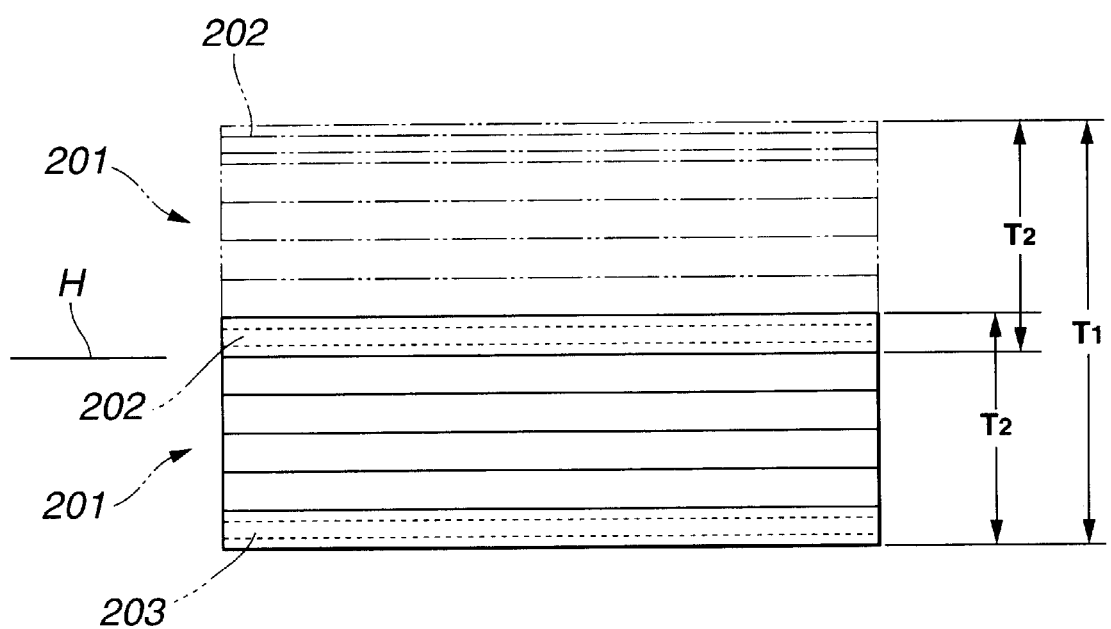
FIG. 38 is an explanatory view showing a problem in a prior-art reference 1.

FIG. 37 shows the pin 22b being in the position (G) when forming the spaces above and below the top but four tray 2.

While moving to the position (G), the pins 2c, 2d are slid on the circular taper face 82c which provides roughly uniform power load, obtaining roughly uniform power load which causes horizontal movement of the separating cam 82.

Figure 29:
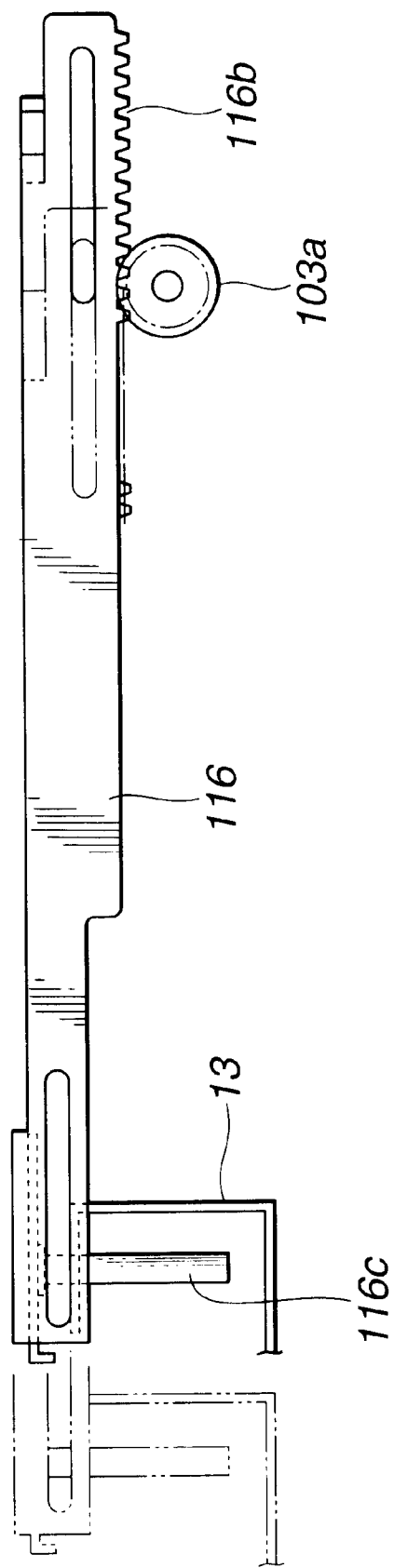
FIG. 29 is an operation explaining view showing the state where torque is provided to the hold means.

When a sensor, not shown, senses the pins 22b arriving at the position (G) as shown in FIG. 16(b), the transfer motor 46 starts to rotate. As described above, when switching to the reproducing mode, the pins 22b enter the bottom slits 143 to push downward the lever 113 of the torque providing means 17. Thus, the lever 113 is rotated counterclockwise about the pin 114 in the state as shown in FIG. 28(a), so that the plate 105 is raised to rotate the lever 110 clockwise about the shaft 109, having the gear 112 already meshed with the gear 103h and also with the gear 104 as shown in FIG. 28(b). Therefore, rotation of the transfer motor 46 is transmitted to the slide bar 116 with the rack 116b through the drive shaft 30 and the gear train 103, moving the slide bar 116 backward as shown in FIG. 29. Then, since the engagement pin 116c of the slide bar 116 in the lower rear portion is loosely engaged with the slot 13a, the hold means 14 are rotated forward. When the positioning pin 119 as shown in FIG. 10(a) goes beyond the position c as a point of inflexion, a biasing force of the toggle spring 120 operates in the opposite direction to rotate the positioning pin 119 to the position a as shown in FIG. 10(b), introducing the chuck plate 99 and the turntable 97 together with the upper and lower arms 12, 13 above and below the selected CD as shown in FIG. 24. When viewing in the plan view, this is changed from the state in FIG. 30 to the state in FIG. 31. A limit switch, not shown, detects rotation of the hold means 14 to stop rotation of the transfer motor 46.

Figure 25:
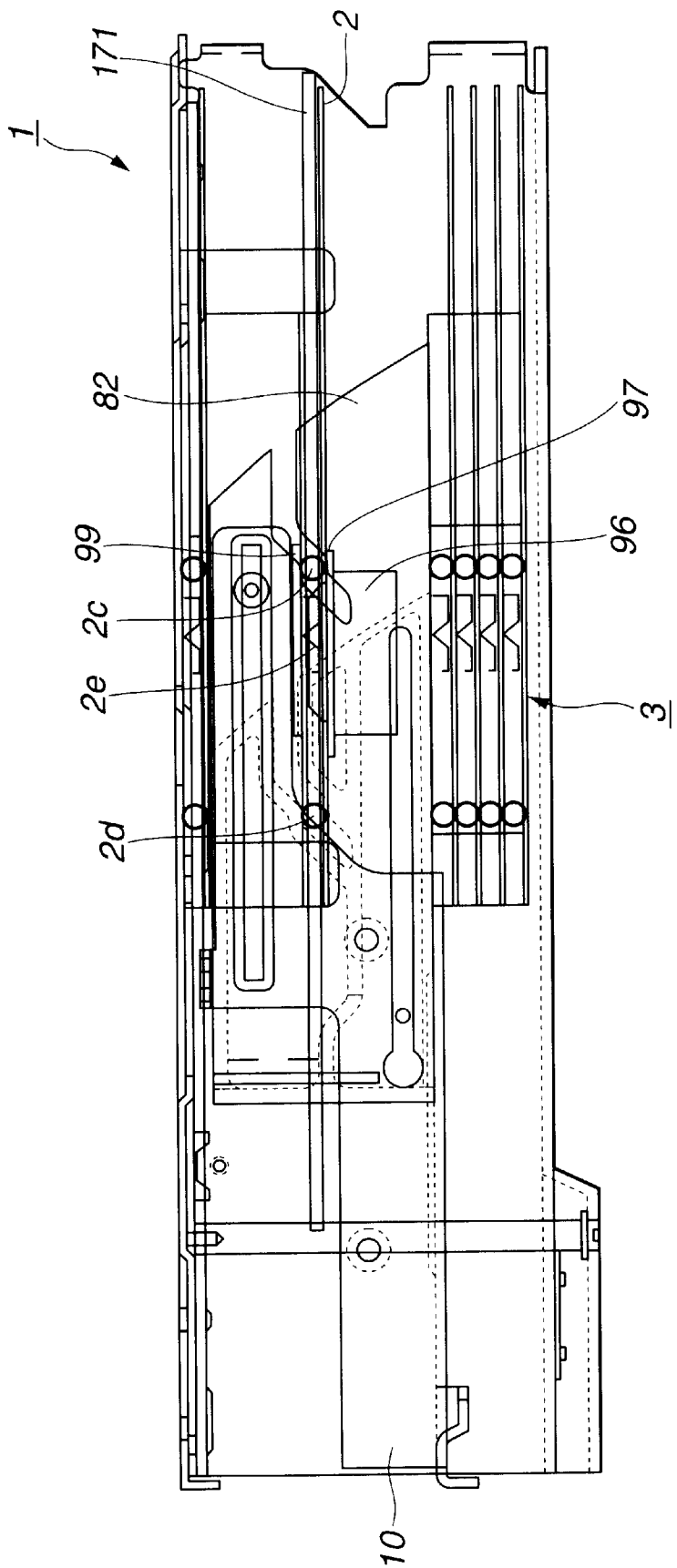
FIG. 25 is a side view showing the state where selected CD is mounted on a turntable and held by hold means as a result of only a selected tray being lowered after separation of the trays into three parts.

When the outer slider 140 is moved forward to have the pin 22b in a position (H) as the forth step as shown in FIG. 16(b), the pin 2d of the selected tray 2 is lowered in the middle stage engagement 82k, so that the selected tray 2 and CD are lowered to place the selected CD on the turntable 97 as shown in FIG. 25. Substantially simultaneously, the separating cam 82 is moved forward together with the outer slider 140 to operate the restriction means 18, which lower the upper arm 12 of the hold means 14 through operation of the hold spring 89, holding the selected CD between the turntable 97 and the chuck plate 99. The following is detailed hold operation. When the pin 22b is in the position (G), and the hold means 14 are in the standby position (B), the guide pin 12a is positioned in the horizontal part 125a of the guide slot 125 as shown in FIG. 32. When the hold means 14 occupy the reproduction position (A), the guide pin 12a is moved to the vertical part 125b of the guide slot 125 as shown in FIGS. 21(b) and 33(a). However, since the pin 127a cannot escape into the escape of the cam groove 82r of the separating cam 82, the guide pin 12a is blocked by the rear face of the restraining lever 127, and thus cannot lower. Then, when the pin 22b is moved to the position (H), the separating cam 82 is also moved forward, so that the pin 127a can escape into the escape of the cam groove 82r as shown in FIGS. 21(b) and 33(b). The pin 127a of the restraining lever 127 biased by the spring 128 is moved upward to the escape of the cam groove 82r of the separating cam 82, lowering the rear portion of the restraining lever 128. As a result, the upper arm 12 biased by the hold spring 89 is lowered as shown in FIG. 34 to hold the selected CD as described above.

The center of rotation of the hold means 14 is accurately positioned on the bottom plate 1e by arranging the support 92 erectly arranged on the bottom plate 1e through the hollow shaft 86 as the center of rotation of the hold means 14, and the positioning pin 119 is pressed against the pickup lifting/lowering stage 10 by the toggle spring 120 for holding, obtaining accurate positioning of the turntable 97 and the chuck plate 99 on the circumferential locus. On the other hand, the guide supports 23 for guiding the tray 2 for mounting the CD 171 thereon are also erectly arranged on the bottom plate 1e in the same way as the support 92, obtaining accurate positioning of the CD 171 on the bottom plate 1e. Therefore, the centers of CD to be reproduced, the turntable 97, and the chuck plate 99 coincide with each other, resulting in sure hold of the CD 171.

Figure 26:
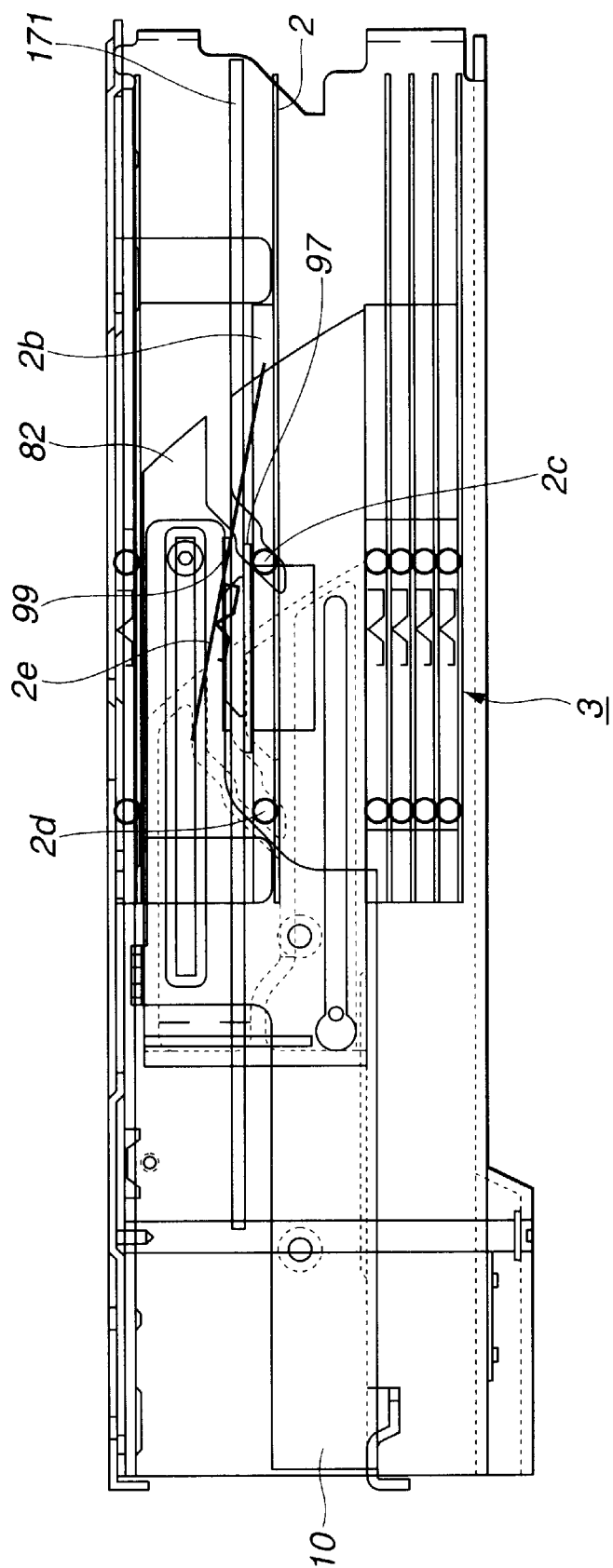
FIG. 26 is a side view showing the state where the selected tray is separated from selected CD as a result of only the selected tray being lowered again after selected CD is held by the hold means.
Figure 27:
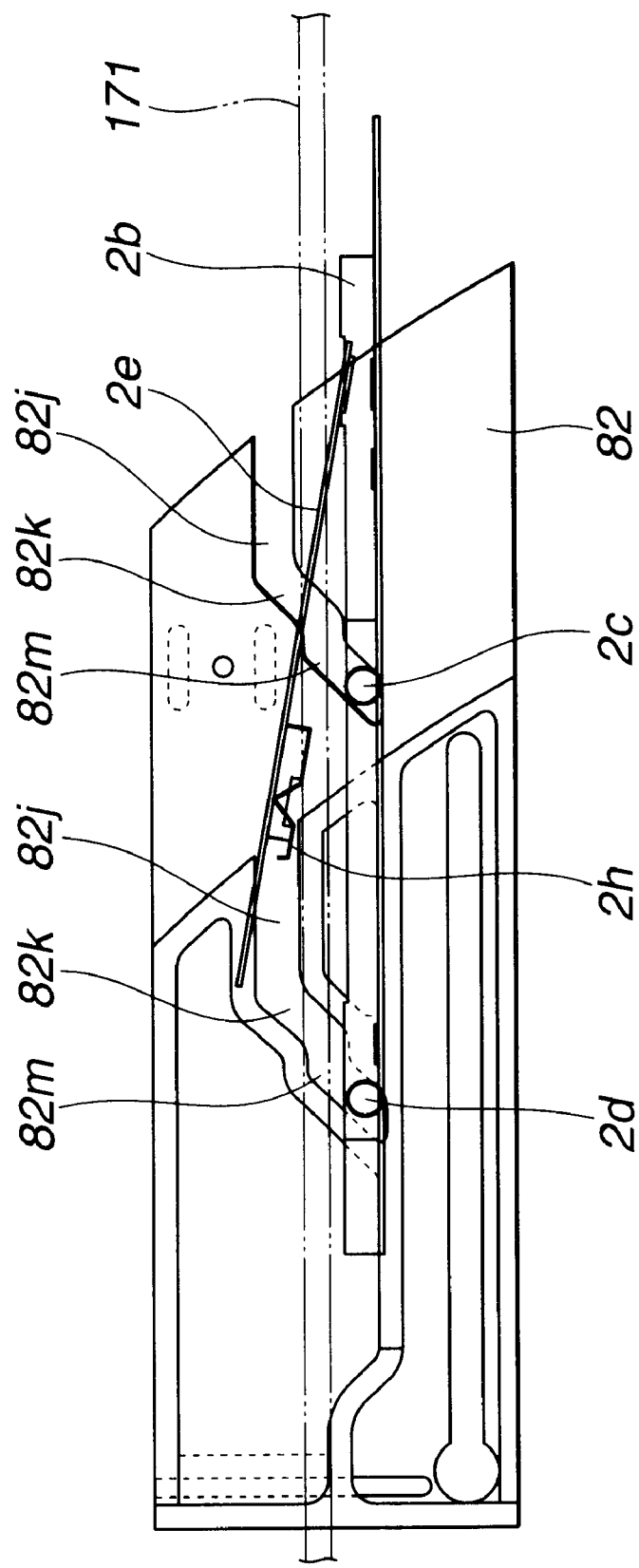
FIG. 27 is an explanatory view showing the state where selected CD Is opened as a result of a plate spring for the selected tray being moved upward upon reproduction.

When the outer slider 140 is moved forward to have the pin 22b in a position (I) (corresponding to the first position) as the final fifth step as shown in FIG. 16(b), the pin 2d of the selected tray 2 is lowered to the lower stage engagement 82m as shown in FIG. 21(a). Thus, as soon as the selected tray 2 that has contacted the selected CD 171 is lowered as shown in FIG. 26 to separate therefrom, the receiver 2h of the plate spring 2e that has retained the selected CD 171 as shown in FIG. 27 is pushed upward by the lower face of the upper stage engagement 82c in the rear portion of the separating cam 82 to release the selected CD 171. At that time, the trays 2 below the selected tray 2 are retained by the lower face 82h of the separating cam 82, and the trays 2 above the selected tray 2 are biased downward by the coil spring 24, preventing the trays 2 from vibrating under the influence of a vibrating vehicle.

After holding the selected CD by the hold means 14 as described above, CD is reproduced with the hold means 14 held in the position (A) as shown in FIG. 31. With rotation of the spindle motor 96, CD is rotated through the turntable 97. Then, the scanning motor 165 of the pickup unit 16 is rotated, which is transmitted to the threaded shaft 164 to move the optical pickup 165 from the inside to the outside in the radial direction of CD, carrying out CD reproduction.

After CD reproduction, the threaded shaft 164 is reversed to return the optical pickup 162 to the initial position. Then, rotation of the scanning motor 165 is stopped, and also rotation of the spindle motor 96 is stopped. Subsequently, through reverse steps, the outer slider 140 is moved backward, and also the separating cam 82 is moved backward. When the pin 127a is returned from the position (H) to the position (G) as shown in FIG. 21(b), the pin 127a of the restraining lever 127 that has been positioned as shown in FIG. 33(b) is disengaged from the escape of the separating cam 82 as shown in FIG. 33(a) to move downward, lowering the rear portion of the restraining lever 127. As a result, the guide pin 12a protruding outward from the hold means 14 is pushed upward along the vertical part 125b of the guide slot 125 to put the hold means 14 in the rotatable state. Subsequently, a sensor, not shown, senses upward movement of the guide pin 12a to rotate the transfer motor 46 in the direction opposite to the above direction, obtaining backward rotation of the hold means 14. When the positioning pin 119 that has occupied the position b as shown in FIG. 10(b) goes beyond the position c as a point of inflexion, a basing force of the toggle spring 120 operates in the opposite direction to rotate the positioning pin 119 to the position b as shown in FIG. 10(a), returning the hold means 14 to the position (B) or standby position. A limit switch, not shown, detects rotation of the hold means 14 to stop rotation of the transfer motor 46. The hold means 14 are biased backward by the toggle spring 120 even in the standby position (B), failing to be influenced from vibrations of the vehicle. Then, when the outer slider 140 is moved backward to return the pin 22b to the standby position (D) as shown in FIG. 16(b), the separating cam 82 is also moved backward to lower all of the first to third trays 2, returning the trays 2 to the state as shown in FIG. 22 where the six trays are not separated.

When reproducing other CD than the top but one CD, the inner slider 139 is moved forward or backward in the state as shown in FIG. 16(a) to relatively move the pin 22b to any of the positions 1, 3, 4, 5 and 6 assigned to the inner slider 139. Then, the outer slider 140 is slid to successively align the positions (D)–(I) on the outer slider 140 to the pin 22b, obtaining repetition of the same operation as described above.

The lowermost position of the loading/unloading mode slit 144 can be heightened by forming the switching slit 146 with greater length, allowing the disc lifting/lowering stage 22 to be held at higher position when the pin 22b is in the position of FIG. 12. As a result, the CD loading/unloading opening 4 can be set at higher position.

Startup of the recording and/or reproducing means makes the pair of pins 22b enter the bottom slits 143 to press downward the lever 113 of the torque providing means 14, thereby allowing rotation of the hold means 14. On the other hand, startup of the ejection means makes the engagement 140c press the pressed portion 70c to open the shutter 64 against a biasing force of the spring 69, and makes the front of the plate 135 push backward the pressed portion 132b of the push lever 132 to rotate the push lever 132, thus pressing CD.

Startup of those different means is carried out by the outer slider 140 or single operation means, obtaining largely reduced number of parts, resulting in simplified and reduced device configuration.

The embodiment is shown with regard to application of the disc recording and/or reproducing device to a disc player for reproducing sound. Alternatively, the device may be applied to sound recording or recording/reproducing devices or image recording and/or reproducing devices. Moreover, the embodiment is shown with the trays placed vertically, optionally, the trays can be placed horizontally. Furthermore, the applied disc has a size of 12 cm, optionally, it may have other size such as 8 cm.

Figure 3:
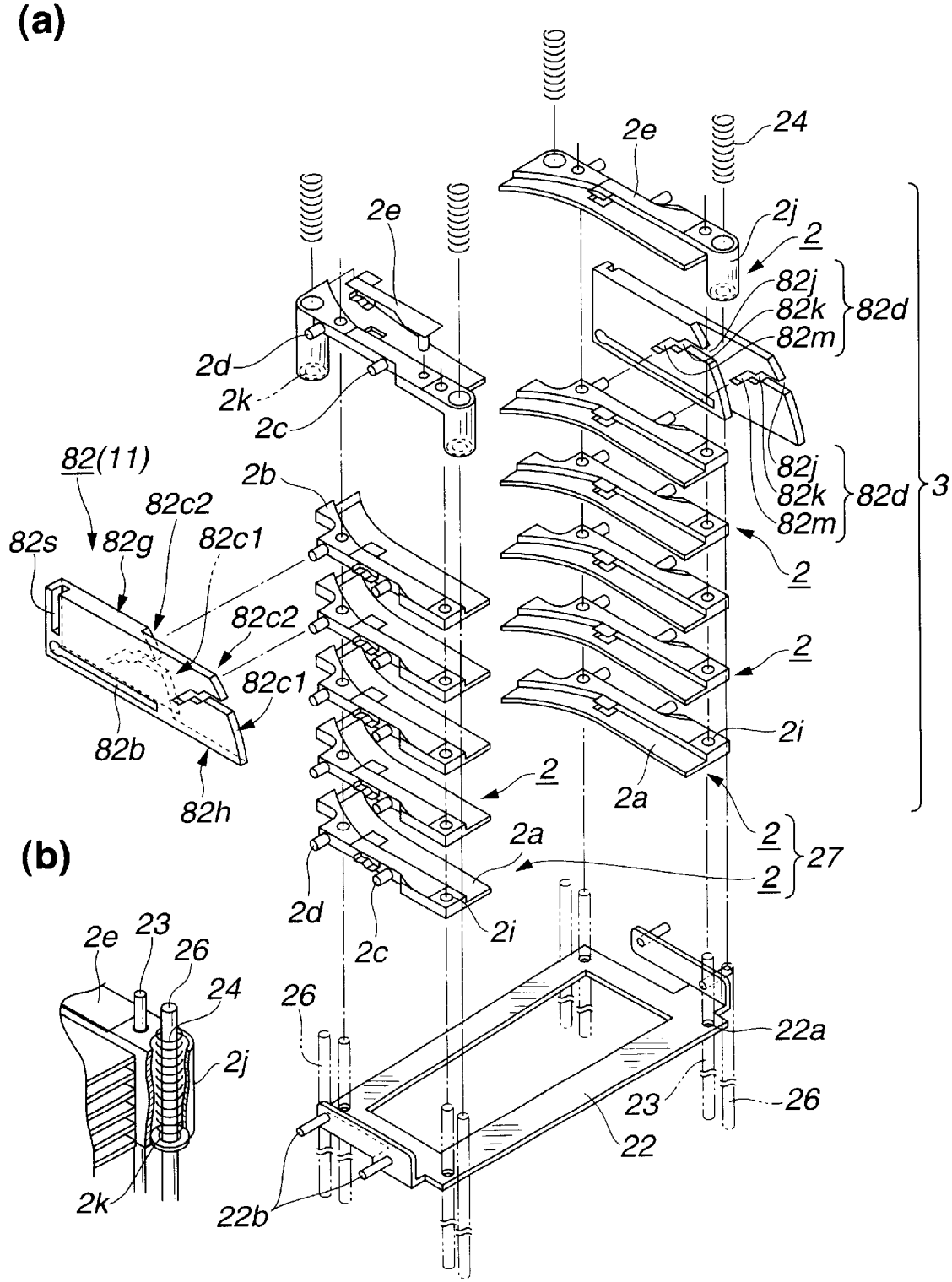
FIG. 3(a) is an exploded perspective view of a disc compartment in the disc player.
FIG. 3(b) is a perspective view, partly broken, of the main part of trays.

Moreover, in the embodiment, the number of trays constituting disc compartment is six, alternatively it may be five or less, or seven or more. Further, in the embodiment, the trays of FIGS. 3–4 are used as the disc mounting means, optionally, a pair of mounting pieces can be used which is obtained by cutting the portion illustrated by the two-dot chain line in the drawings to remove the center of the aluminum plate 2a with only both ends for mounting the outer periphery of CD being left.

Industrial Applicability

The disc recording and/or reproducing device according to the present invention is constructed to form spaces above and below a selected one of the discs placed one upon another to hold it for reproduction on the spot, allowing a reduction in size, thus leading to suitable application for a disc player mounted on a vehicle having less mounting spaces.

What is claimed is:

1. A disc recording and/or reproducing device, comprising:
   a plurality of disc mounting means for mounting discs thereon;
   a support means for placing said plurality of disc mounting means one upon another and movably supporting the disc mounting means in a placing direction;
   a disc driving means for driving a rotation supporting means for rotatably supporting a selected disc;
   a bias means for biasing said plurality of disc mounting means in one side of the placing direction; and
   a movable control means, provided with a pair of separation control parts for moving a selected disc mounting means for mounting the selected disc to another side against said bias means so as to form a first space for disposing said disc driving means on one side of said selected disc mounting means, and for forming said first space, the pair of separation control parts including an outer control part adapted to cooperate with a first portion of the selected disc mounting means and an inner control part adapted to cooperate with a second portion of the selected disc mounting means, the outer and inner separation control parts spaced apart from one another in a first direction and offset relative to one another in a second direction perpendicular to the first direction.

2. The disc recording and/or reproducing device according to claim 1, further comprising:
   a position restricting means for restricting, when the disc mounting means exists on one side of said selected disc mounting means, movement of the one-side disc mounting means to another side,
   wherein the position of the one-side disc mounting means is restricted to form said first space between the selected disc mounting means and the one-side disc mounting means.

3. The disc recording and/or reproducing device according to claim 2, wherein said position restricting means is formed with said control means.

4. The disc recording and/or reproducing device according to claim 3, wherein said position restricting means comprises a face of said control means along a moving direction.

5. The disc recording and/or reproducing device according to claim 2, further comprising:
   a second control means, the control means and the second control means forming a pair of control means arranged so that movement thereof leads to formation of said first space on one side of the selected disc mounting means.

6. The disc recording and/or reproducing device according to claim 5, wherein said pair of control means comprises said position restricting means.

7. The disc recording and/or reproducing device according to claim 1, further comprising:
   a disc holding means for holding said selected disc between the disc holding means and said rotation supporting means,
   wherein when the disc mounting means exists on another side of said selected disc mounting means, said control means forms a second space between said selected disc mounting means and said another-side disc mounting means to dispose said disc holding means.

8. A disc recording and/or reproducing device, comprising:
   a plurality of disc mounting means for mounting discs thereon;
   a support means for placing said plurality of disc mounting means one upon another and movably supporting the disc mounting means in a placing direction;
   a disc driving means for driving a rotation supporting means for mounting and rotatably supporting a selected disc;
   a disc holding means for holding the disc mounted on said rotation supporting means;
   a bias means for biasing said disc mounting means in one side of the placing direction; and
   a control means for forming a first space for disposing said disc driving means on one side of the selected disc mounting means on which the selected disc is mounted, and a second space for disposing said disc holding means on another side thereof,
   wherein said control means comprises:
      a first separation control part for moving to said another side said selected disc mounting means and the disc mounting means on another side compared with the selected disc mounting means in accordance with movement of a first half of said control means;
      a second separation control part for moving to said another side only said disc mounting means on another side compared with said selected disc mounting means in accordance with movement of a second half of said control means; and
      a pair of third separation control parts arranged between the first and second separation control parts and for holding said selected disc mounting means, the pair of third separation control parts including an outer control part adapted to cooperate with a first portion of the selected disc mounting means and an inner control part adapted to cooperate with a second portion of the selected disc mounting means, the outer and inner separation control parts spaced apart from one another in a first direction and offset relative to one another in a second direction perpendicular to the first direction.

9. The disc recording and/or reproducing device according to claim 8, further comprising:
   a position restricting means for restricting, when the disc mounting means exists on one side of said selected disc mounting means, movement of the one-side disc mounting means to another side,
   wherein the position of the one-side disc mounting means is restricted to form said first space between the selected disc mounting means and the one-side disc mounting means.

10. The disc recording and/or reproducing device according to claim 9, wherein said position restricting means is arranged with said control means.

11. The disc recording and/or reproducing device according to claim 10, wherein said position restricting means comprises a face of said control means along a moving direction.

12. The disc recording and/or reproducing device according to claim 8, wherein said third separation control part includes a lowering control part for lowering said selected disc mounting means to dispose said selected disc on the rotation supporting means disposed in said first space.

13. The disc recording and/or reproducing device according to claim 8, wherein said disc mounting means is arranged with a spring means for pressing the disc from another side, wherein the spring means releases pressing of the disc by said control means.

14. A disc recording and/or reproducing device, comprising:
   a disc compartment comprising a plurality of disc mounting means movably placed one upon another in a placing direction and for mounting discs thereon;
   a space forming means arranged with a pickup lifting/lowering means moving in the disc placing direction in said disc compartment and for forming spaces on one and another sides of a moving direction of the disc mounting means on which a selected disc is mounted, the space forming means including a pair of separation control parts including an outer control part adapted to cooperate with a first portion of the disc mounting means on which the selected disc is mounted and an inner control part adapted to cooperate with a second portion of the disc mounting means on which the selected disc is mounted, the outer and inner separation control parts spaced apart from one another in a first direction and offset relative to one another in a second direction perpendicular to the first direction;
   a rotation supporting means for mounting said selected disc thereon and rotating/supporting the selected disc;
   a disc holding means for holding the disc between the disc holding means and said rotation supporting means; and
   an optical pickup for recording and/or reproducing the disc mounted on said rotation supporting means.

15. The disc recording and/or reproducing device according to claim 14, wherein said space forming means is movably arranged with said pickup lifting/lowering means, and said rotation supporting means is rotatably arranged with a hold means rotatably provided with said pickup lifting/lowering means.

16. The disc recording and/or reproducing device according to claim 15, wherein said hold means comprises:
   a first arm provided with said rotation supporting means;
   a second arm provided with said disc holding means; and
   a restriction means for moving said disc holding means and restricting movement thereof.

17. The disc recording and/or reproducing device according to claim 16, wherein said restriction means includes a first restriction means for restricting movement of said disc holding means, and a second restriction means for releasing restriction by the first restriction means.

18. The disc recording and/or reproducing device according to claim 16, wherein said optical pickup is movably arranged with said first arm.

19. A disc recording and/or reproducing device, comprising:

a disc compartment comprising a plurality of disc mounting means placed one upon another, on which discs are mounted;

a bias means for providing a pressing force on one side of a placing direction in said disc compartment to stabilize said disc mounting means; and a space forming means, moved in a direction substantially perpendicular to the placing direction of said disc mounting means, for moving said disc mounting means to another side against the pressing force of said bias means, said space forming means having a circular part formed in a portion thereof abutting on said disc mounting means so as to obtain a substantially uniform load during said movement, the space forming means including a pair of separation control parts including an outer control part adapted to cooperate with a first portion of the disc mounting means on which a selected disc is mounted and an inner control part adapted to cooperate with a second portion of the disc mounting means on which the selected disc is mounted, the outer and inner separation control parts spaced apart from one another in a first direction and offset relative to one another in a second direction perpendicular to the first direction.

* * * * *